US011978406B2

(12) United States Patent
Hong et al.

(10) Patent No.: US 11,978,406 B2
(45) Date of Patent: May 7, 2024

(54) DISPLAY DEVICE

(71) Applicant: LG Display Co., Ltd., Seoul (KR)

(72) Inventors: Hyun Gi Hong, Paju-si (KR); Jong Hee Hwang, Paju-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 17/959,686

(22) Filed: Oct. 4, 2022

(65) Prior Publication Data

US 2023/0137365 A1 May 4, 2023

(30) Foreign Application Priority Data

Oct. 28, 2021 (KR) ........................ 10-2021-0145656

(51) Int. Cl.

*G09G 3/3291* (2016.01)
*G09G 3/20* (2006.01)
*G09G 3/3233* (2016.01)

(52) U.S. Cl.

CPC ......... *G09G 3/3291* (2013.01); *G09G 3/2096* (2013.01); *G09G 3/3233* (2013.01); *G09G 2300/0819* (2013.01); *G09G 2300/0828* (2013.01); *G09G 2300/0842* (2013.01); *G09G 2310/0286* (2013.01);

(Continued)

(58) Field of Classification Search

CPC ................. G09G 3/3233; G09G 3/006; G09G 2320/043; G09G 2320/0233; G09G 2320/029; G09G 2320/045; G09G 2320/0295; G09G 2320/0693;

(Continued)

(56) References Cited

U.S. PATENT DOCUMENTS 8,339,386 B2 12/2012 Leon et al.
9,236,011 B2 1/2016 Mizukoshi (Continued)

FOREIGN PATENT DOCUMENTS

CN 1703731 A 11/2005
CN 102687193 A 9/2012

(Continued)

OTHER PUBLICATIONS

European Patent Office, Extended European Search Report and Opinion, EP Patent Application No. 22195911.7, dated Mar. 14, 2023, ten pages.

(Continued)

*Primary Examiner* — Dong Hui Liang
(74) *Attorney, Agent, or Firm* — Fenwick & West LLP

(57) ABSTRACT

A display device includes: a plurality of pixels connected to power lines to which a pixel driving voltage and a reference voltage are applied, a plurality of data lines to which data voltages of pixel data of an input image are applied, and a plurality of gate lines to which a gate signal is applied; a display panel driver configured to write the pixel data of the input image to the plurality of pixels during a display mode of the display device and to write preset sensing data to the plurality of pixels during a sensing mode of the display device; and a sensing unit configured to simultaneously sense the plurality of the pixels by measuring a current flowing through a first power line from the plurality of power lines to which the pixel driving voltage is applied to the plurality of pixels during the sensing mode.

18 Claims, 12 Drawing Sheets

(52) U.S. Cl.
CPC . *G09G 2310/0297* (2013.01); *G09G 2310/08* (2013.01); *G09G 2320/029* (2013.01); *G09G 2330/021* (2013.01)

(58) Field of Classification Search
CPC ... G09G 2320/0223; G09G 2300/0819; G09G 2300/043
See application file for complete search history.

(56) References Cited

U.S. PATENT DOCUMENTS

| | | | | |
|---|---|---|---|---|
| 9,514,686 | B2 | 12/2016 | Lee et al. | |
| 9,905,164 | B2 | 2/2018 | Mizukoshi | |
| 10,062,330 | B2 | 8/2018 | Han et al. | |
| 10,140,929 | B2 | 11/2018 | Kim | |
| 10,181,291 | B2 | 1/2019 | Han et al. | |
| 10,366,676 | B2 | 7/2019 | Kim et al. | |
| 10,467,960 | B2 | 11/2019 | Do et al. | |
| 10,510,303 | B2 | 12/2019 | Kim | |
| 11,217,171 | B2 | 1/2022 | Kim et al. | |
| 2008/0024136 | A1* | 1/2008 | Mizukoshi | G09G 3/3233 324/403 |
| 2009/0207106 | A1* | 8/2009 | Mizukoshi | G09G 3/3233 345/76 |
| 2011/0074750 | A1 | 3/2011 | Leon et al. | |
| 2011/0109660 | A1 | 5/2011 | Kim | |
| 2013/0050292 | A1* | 2/2013 | Mizukoshi | G09G 3/3233 345/77 |
| 2014/0152633 | A1* | 6/2014 | Park | G09G 3/3291 345/207 |
| 2015/0061981 | A1* | 3/2015 | Lee | G09G 3/3291 345/77 |
| 2015/0170569 | A1 | 6/2015 | Han et al. | |
| 2016/0086539 | A1 | 3/2016 | Mizukoshi | |
| 2017/0011688 | A1* | 1/2017 | Kim | G01R 15/09 |
| 2018/0144717 | A1 | 5/2018 | Kim et al. | |
| 2018/0330670 | A1 | 11/2018 | Han et al. | |
| 2019/0035331 | A1 | 1/2019 | Do et al. | |
| 2019/0035335 | A1 | 1/2019 | Kim et al. | |
| 2019/0088210 | A1 | 3/2019 | Kim | |
| 2021/0134215 | A1 | 5/2021 | Chun | |
| 2021/0287609 | A1 | 9/2021 | An et al. | |
| 2023/0008511 | A1 | 1/2023 | Son et al. | |

FOREIGN PATENT DOCUMENTS

| | | | |
|---|---|---|---|
| CN | 102968954 | A | 3/2013 |
| CN | 104424893 | A | 3/2015 |
| CN | 104715716 | A | 6/2015 |
| CN | 106340269 | A | 1/2017 |
| CN | 108091302 | A | 5/2018 |
| CN | 109308877 | A | 2/2019 |
| CN | 109308879 | A | 2/2019 |
| JP | 2009-198761 | A | 9/2009 |
| JP | 2010-008718 | A | 1/2010 |
| JP | 2013-506168 | A | 2/2013 |
| JP | 2019-028426 | A | 2/2019 |
| JP | 2019-028454 | A | 2/2019 |
| KR | 10-2018-0057073 | A | 5/2018 |
| KR | 10-2019-0012444 | A | 2/2019 |
| KR | 10-2019-0076309 | A | 7/2019 |
| KR | 10-2020-0058206 | A | 5/2020 |
| KR | 10-2020-0060903 | A | 6/2020 |
| KR | 10-2021-0079600 | A | 6/2021 |

OTHER PUBLICATIONS

The Japan Patent Office, Office Action, Japanese Patent Application No. 2022-160648, dated Oct. 12, 2023, eight pages.

Korean Intellectual Property Office, Office Action, Korean Patent Application No. 10-2021-0145656, Jan. 31, 2024, 15 pages.

China National Intellectual Property Administration, Office Action, Chinese Patent Application No. 202211062594.X, Mar. 14, 2024, 18 pages.

* cited by examiner

DISPLAY DEVICE

CROSS-REFERENCE TO RELATED APPLICATION

This application claims priority to and the benefit of Republic of Korea Patent Application No. 10-2021-0145656, filed on Oct. 28, 2021, which is hereby incorporated by reference in its entirety.

BACKGROUND

1. Field

The present disclosure relates to a display device.

2. Discussion of Related Art

Electroluminescent display devices may be classified into inorganic light emitting display devices and organic light emitting display devices depending on the material of the emission layer. The organic light emitting display device of an active matrix type includes an organic light emitting diode (hereinafter, referred to as "OLED") that emits light by itself (e.g., self-emissive), and has an advantage in that the response speed is fast and the luminous efficiency, luminance, and viewing angle are large. In the organic light emitting display device, the OLED is formed in each pixel. The organic light emitting display device has a fast response speed, excellent luminous efficiency, luminance, and viewing angle, and has excellent contrast ratio and color reproducibility since it can express black gray scales in complete black color.

Electroluminescence display devices include a display panel on which input image data is reproduced. Each of pixels in the display panel includes a pixel circuit. The pixel circuit includes a light emitting element and a driving element for driving the light emitting element.

Due to device characteristic deviations and process deviations caused in the manufacturing process of the display panel, there may be differences in electrical characteristics of the driving element among pixels, and such differences may increase as driving time of the pixels elapses. In order to compensate for the deviations in the electrical characteristic of the driving element among pixels, an internal compensation technique or an external compensation technique may be applied to an organic light emitting display device. The internal compensation technique samples a threshold voltage of the driving element for each sub-pixel by using an internal compensation circuit implemented in each pixel circuit and compensates the gate-source voltage Vgs of the driving element by the threshold voltage. The external compensation technique senses in real time a current or voltage of the driving element that varies according to electrical characteristics of the driving element by using an external compensation circuit. The external compensation technique compensates for the deviation (or variation) of the electrical characteristics of the driving element in each pixel in real time by modulating the pixel data (digital data) of the input image by the electrical characteristic deviation (or variation) of the driving element sensed for each pixel.

In order to sense the variation in electrical characteristics of each of the pixels for the external compensation technique, the sensing time is increased because the pixel is sensed. In addition, a sensing circuit including circuits such as amplifiers, integrators, samples & holders, and analog-to-digital converters (ADC) need to be added to each of the channels of a drive IC, which increases the cost of the drive IC.

SUMMARY

The present disclosure has been made in an effort to address aforementioned necessities and/or drawbacks. In particular, the present disclosure provides a display device capable of sensing electrical characteristics of all pixels of a display panel in a short time without adding a sensing circuit to a drive integrated circuit (IC) and suppressing light emission of the pixels in a sensing mode.

The problems to be solved by the present disclosure are not limited to those mentioned above, and other problems not mentioned will be clearly understood by those skilled in the art from the following description.

In one embodiment, a display device comprises: a plurality of pixels connected to power lines to which a pixel driving voltage and a reference voltage are applied, a plurality of data lines to which data voltages of pixel data of an input image is applied, and a plurality of gate lines to which a gate signal is applied; a display panel driver configured to write the pixel data of the input image to the plurality of pixels during a display mode of the display device, and to write preset sensing data to the plurality of pixels during a sensing mode of the display device; and a sensing circuit configured to simultaneously sense the plurality of the pixels by measuring a current flowing through a first power line from the plurality of power lines to which the pixel driving voltage is applied to the plurality of pixels during the sensing mode, wherein the display panel driver includes: a data driver configured to output, through a plurality of data voltage output channels, the data voltages of the pixel data during the display mode and data voltages of the preset sensing data during the sensing mode; and a gate driver configured to output the gate signal.

In one embodiment, a display device comprises: a display panel including a plurality of pixels that are connected to a power line to which a pixel driving voltage is supplied, the plurality of pixels divided into a plurality of rows of pixel blocks that extend along a first direction and each pixel block including a different subset of pixels from the plurality of pixels; a plurality of data lines that are connected to the plurality of pixels, the plurality of data lines extending along a second direction that intersects the first direction; a plurality of gate lines that are connected to the plurality of pixels and extend along the first direction, the plurality of gate lines applying gate signals to the plurality of pixels; a display panel driver configured to supply a plurality of data voltages of an image to the plurality of data lines during a display mode, and to supply sensing data to the plurality of data lines during a sensing mode; and a sensing circuit configured to sense current flowing through the power line that is connected to a respective subset of pixels included in each pixel block included in a row of pixel blocks during the sensing mode, each of the respective subset of pixels included in each pixel block supplied the sensing data during the sensing mode.

In one embodiment, a sensing circuit comprises: a resistor; and a switch configured to serially connect the resistor to a power line that supplies a pixel driving voltage to a plurality of pixels of a display panel during a sensing period, and configured to disconnect the resistor from the power line during a display period during which an image is displayed by the display panel, wherein the sensing circuit is configured to simultaneously sense a subset of pixels from the plurality of the pixels during the sensing period by measuring a current flowing through the power line responsive to sensing data being applied to the subset of pixels during the sensing mode.

The present disclosure simultaneously senses current flowing from a plurality of pixels through a power line to which a pixel driving voltage is applied. As a result, the display panel can be driven by using the drive IC, in which does not require the sensing circuit, and the time required to sense the electrical characteristics of the pixels may be reduced.

According to the present disclosure, pixels are sensed in a non-emission state by blocking a current flowing through a light emitting element in a sensing mode, thereby preventing light emission of the pixels from being visually recognized in the sensing mode.

According to the present disclosure, the current of the pixels may be increased by increasing the pixel driving voltage in the sensing mode.

According to the present disclosure, it is possible to prevent the input voltage overflow in the analog-to-digital converter in the sensing mode.

The effects of the present disclosure are not limited to the above-mentioned effects, and other effects that are not mentioned will be apparently understood by those skilled in the art from the following description and the appended claims.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1:
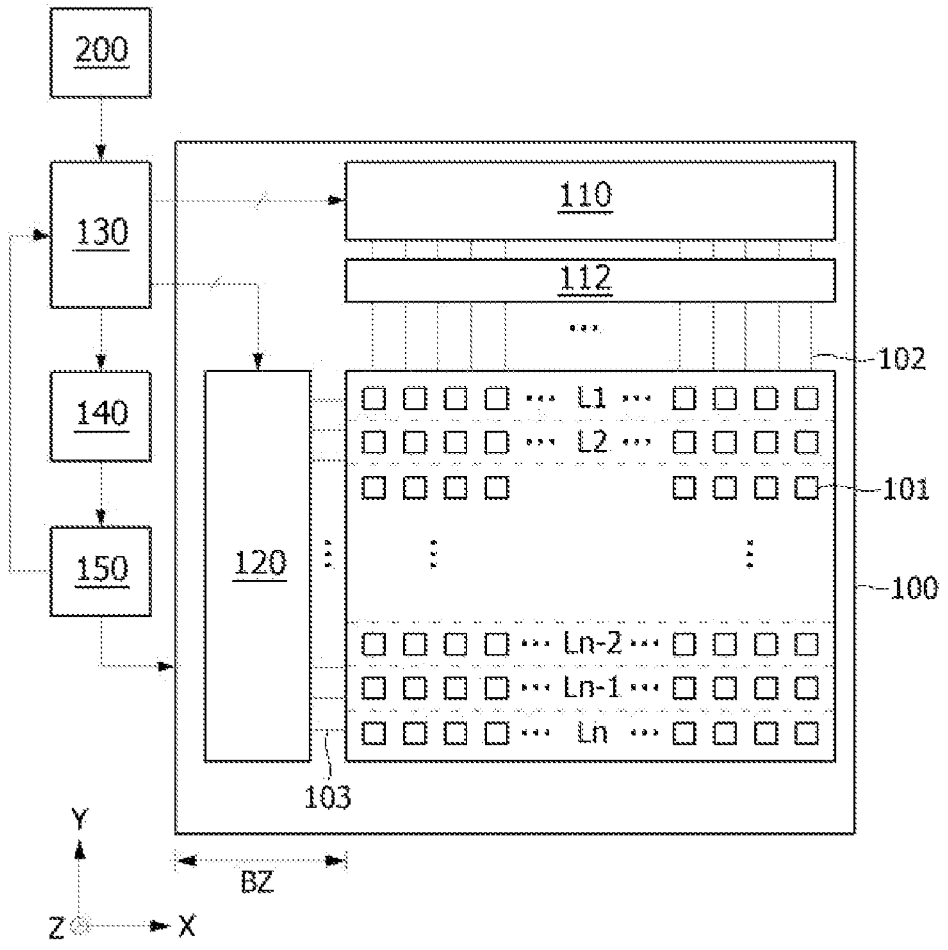
FIG. 1 is a block diagram illustrating a display device according to an embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," and "having," used herein are generally intended to allow other components to be added unless the terms are used with the term "only." Any references to singular may include plural unless expressly stated otherwise.

Components are interpreted to include an ordinary error range even if not expressly stated.

When the position relation between two components is described using the terms such as "on," "above," "below," and "next," one or more components may be positioned between the two components unless the terms are used with the term "immediately" or "directly."

The terms "first," "second," and the like may be used to distinguish components from each other, but the functions or structures of the components are not limited by ordinal numbers or component names in front of the components.

The same reference numerals may refer to substantially the same elements throughout the present disclosure.

The following embodiments can be partially or entirely bonded to or combined with each other and can be linked and operated in technically various ways. The embodiments can be carried out independently of or in association with each other.

Each of the pixels may include a plurality of sub-pixels having different colors to in order to reproduce the color of the image on a screen of the display panel. Each of the sub-pixels includes a transistor used as a switch element or a driving element. Such a transistor may be implemented as a thin film transistor (TFT).

A driving circuit of the display device writes a pixel data of an input image to pixels on the display panel. To this end, the driving circuit of the display device may include a data driving circuit configured to supply data signal to the data lines, a gate driving circuit configured to supply a gate signal to the gate lines, and the like.

In a display device of the present disclosure, the pixel circuit and the gate driving circuit may include a plurality of transistors. Transistors may be implemented as oxide thin film transistors (oxide TFTs) including an oxide semiconductor, low temperature polysilicon (LTPS) TFTs including low temperature polysilicon, or the like. In embodiments, descriptions will be given based on an example in which the transistors of the pixel circuit and the gate driving circuit are implemented as the n-channel oxide TFTs, but the present disclosure is not limited thereto.

Generally, a transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower (e.g., less) than a drain voltage such that electrons may flow from a source to a drain. The n-channel transistor has a direction of a current flowing from the drain to the source. In the case of a p-channel transistor (p-channel metal-oxide semiconductor (PMOS), since carriers are holes, a source voltage is higher (e.g., greater) than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. The gate-on voltage is set to a voltage higher than a threshold voltage of a transistor, and the gate-off voltage is set to a voltage lower than the threshold voltage of the transistor.

The transistor is turned on in response to the gate-on voltage and is turned off in response to the gate-off voltage. In the case of an n-channel transistor, a gate-on voltage may be a gate high voltage VGH, and a gate-off voltage may be a gate low voltage VGL.

Hereinafter, various embodiments of the present disclosure will be described in detail with reference to the accompanying drawings. In the following embodiments, a display device will be described focusing on an organic light emitting display device, but the present disclosure is not limited thereto.

Figure 2:
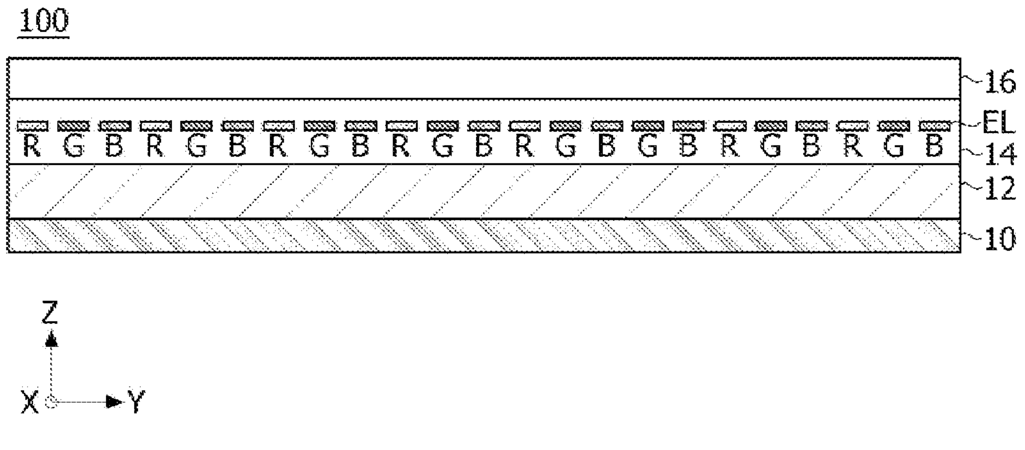
FIG. 2 is a cross-sectional view illustrating a cross-sectional structure of the display panel shown in FIG. 1 according to an embodiment of the present disclosure.

Referring to FIGS. 1 and 2, a display device according to an embodiment of this disclosure includes a display panel 100, a display panel driver for writing pixel data to pixels 101 in the display panel 100, a power supply 140 for generating power required to drive the pixels 101 and the display panel driver, and a current sensing unit 150.

The display panel 100 may be a display panel of a rectangular structure having a length in the X-axis direction, a width in the Y-axis direction, and a thickness in the Z-axis direction. The display panel 100 includes a pixel array that displays an input image on a screen. The pixel array includes a plurality of data lines 102, a plurality of gate lines 103 that intersect with the data lines 102, and pixels 101 arranged in a matrix form. The display panel 100 may further include power lines commonly connected to the pixels. The power lines may include a power line to which a pixel driving voltage ELVDD is applied, a power line to which an initialization voltage Vinit is applied, a power line to which a reference voltage Vref is applied, and a power line to which a low-potential power supply voltage ELVSS is applied. These power lines are commonly connected to the pixels.

The pixel array includes a plurality of pixel lines L1 to Ln. Each of the pixel lines L1 to Ln includes one line of pixels arranged along a line direction X in the pixel array of the display panel 100. Pixels arranged in one pixel line share the same gate line 103. Sub-pixels arranged in the column direction Y along a data line direction share the same data line 102. One horizontal period 1H is a time obtained by dividing one frame period by the total number of pixel lines L1 to Ln.

The display panel 100 may be implemented as a non-transmissive display panel or a transmissive display panel. The transmissive display panel may be applied to a transparent display device in which an image is displayed on a screen and an actual background is visible.

The display panel may be manufactured as a flexible display panel. The flexible display panel may be implemented as an OLED panel using a plastic substrate. A pixel array and a light emitting element in the plastic OLED panel may be disposed on an organic thin film adhered onto a back plate.

Each of the pixels 101 may be divided into a red sub-pixel, a green sub-pixel, and a blue sub-pixel for color implementation. Each of the pixels 101 may further include a white sub-pixel. Each of the sub-pixels includes a pixel circuit. Hereinafter, a pixel 101 may be interpreted as having the same meaning as a sub-pixel. Each of the pixel circuits is connected to data lines, gate lines, and power lines.

The pixels 101 may be arranged as real color pixels and pentile pixels. The pentile pixel may realize a higher resolution than the real color pixel by driving two sub-pixels having different colors as one pixel 101 through the use of a preset pixel rendering algorithm. The pixel rendering algorithm may compensate for insufficient color representation in each pixel with the color of light emitted from its adjacent pixel.

Touch sensors may be disposed on the screen of the display panel 100. The touch sensors may be disposed as an on-cell type or an add-on type on the screen of the display panel or implemented as in-cell type touch sensors embedded in the pixel array AA.

In a cross-sectional structure, the display panel 100 may include a circuit layer 12, a light emitting element layer 14, and an encapsulation layer 16 stacked on a substrate 10, as shown in FIG. 2.

The circuit layer 12 may include a pixel circuit connected to wirings such as data lines, gate lines, and power lines, a gate driver GIP connected to the gate lines, and a demultiplexer array 112. The wirings and circuit elements in the circuit layer 12 may include a plurality of insulating layers, two or more metal layers separated with the insulating layer therebetween, and an active layer including a semiconductor material.

The light emitting element layer 14 may include a light emitting element EL driven by the pixel circuit. The light emitting elements EL may include a red (R) light emitting element, a green (G) light emitting element, and a blue (B) light emitting element. The light emitting element layer 14 may include a white light emitting element and a color filter. The light emitting elements EL in the light emitting element layer 14 may be covered by a protective layer including an organic film and a passivation film.

An encapsulation layer 16 covers the light emitting element layer 14 to seal the circuit layer 12 and the light emitting element layer 14. The encapsulation layer 16 may also have a multi-insulating film structure in which an organic film and an inorganic film are alternately stacked. The inorganic film blocks or at least reduces permeation of moisture and oxygen. The organic film planarizes the surface of the inorganic film. When the organic layer and the inorganic layer are stacked in multiple layers, the movement path of moisture and oxygen becomes longer than that of a single layer, so that penetration of moisture and oxygen affecting the light emitting element layer 14 may be effectively blocked.

A touch sensor layer may be formed and disposed on the encapsulation layer 16. The touch sensor layer may include capacitive touch sensors that sense a touch input based on a change in capacitance before and after the touch input. The touch sensor layer may include metal wiring patterns and insulating layers forming the capacitance of the touch sensors. A capacitance of the touch sensor may be formed between the metal wiring patterns. A polarizer may be disposed on the touch sensor layer. The polarizer may improve visibility and contrast ratio by converting the polarization of external light reflected by metals of the touch sensor layer and the circuit layer 12. The polarizer may be implemented as a circular polarizer to which a linear polarizer and a phase retardation film are bonded. A cover glass may be adhered to the polarizer.

The display panel 100 may further include a touch sensor layer and a color filter layer stacked on the encapsulation layer 16. The color filter layer may include red, green, and blue color filters and a black matrix pattern. The color filter layer absorbs a portion of the wavelength of light reflected from the circuit layer and the touch sensor layer, so that it can replace the polarizer and increase the color purity. In this embodiment, the color filter layer having a higher light transmittance than the polarizer may be applied to the display panel 100 to improve the light transmittance of the display panel 100 and improve the thickness and flexibility of the display panel 100. A cover glass may be adhered to the color filter layer.

The power supply 140 generates direct current (DC) power required for driving the pixel array and the display panel driver of the display panel 100 by using a DC-DC converter. The DC-DC converter may include a charge pump, a regulator, a buck converter, a boost converter, and the like. The power supply 140 may adjust the DC input voltage applied from a host system 200 to generate constant voltages (or DC voltages), such as gamma reference voltage VGMA, gate-on voltage VGH, gate-off voltage VGL, pixel driving voltage ELVDD, low-potential power supply voltage ELVSS, reference voltage Vref, initialization voltage Vini, or the like, and a voltage applied to the gate driver 120. The gamma reference voltage VGMA is supplied to the data driver 110. The gate-on voltage VGH and the gate-off voltage VGL are supplied to the gate driver 120. Such constant voltages as the pixel driving voltage ELVDD, the low-potential power supply voltage ELVSS, the reference voltage Vref, and the initialization voltage Vinit are commonly supplied to the pixels. The power supply 140 may change the voltage level of the output voltage for each mode under the control of the timing controller 130.

The pixel driving voltage ELVDD may be outputted from a main power source of the host system 200 and supplied to the display panel 100. In this case, the power supply 140 does not need to output the pixel driving voltage ELVDD.

The display panel driver displays an input image on the screen of the display panel 100 in a display mode under the control of a timing controller TCON 130. The display mode may include a low-speed mode capable of reducing power consumption. The display panel driver senses the electrical characteristics of the pixels 101 in units of blocks divided on the screen of the display panel 100 in a sensing mode under the control of the timing controller 130. In the sensing mode, the electrical characteristics of the pixels 101 are sensed in a non-emission state.

The display panel driver writes pixel data of the input image to the pixels 101 in the display mode, and writes preset sensing data to the pixels 101 regardless of the input image in the sensing mode.

The sensing mode may be activated in at least one of a power on sequence in which the display device is powered on and the display panel driver starts driving, a vertical blank VB between frame periods, and a power off sequence in which the display panel driver is driven for a preset delay time immediately after the display device is powered off and then stop. In the sensing mode, the display panel driver may sense electrical characteristics of the pixels 101 in preset units of blocks on the screen of the display panel, and may compensate for a change in electrical characteristics of the pixels by modulating pixel data with a compensation value generated from a compensation unit in the timing controller 130.

The display panel driver includes the data driver 110 and the gate driver 120. The display panel driver may further include a de-multiplexer array 112 disposed between the data driver 110 and the data lines 102.

The de-multiplexer array 112 sequentially supplies the data voltages outputted from the respective channels of the data driver 110 to the data lines 102 using a plurality of de-multiplexers DEMUX. The de-multiplexer may include a plurality of switch elements disposed on the display panel 100. When the de-multiplexer is disposed between the output terminals of the data driver 110 and the data lines 102, the number of data output voltage channels of the data driver 110 may be reduced. The de-multiplexer array 112 may be omitted.

The display panel driver may further include a touch sensor driver for driving the touch sensors. The touch sensor driver is omitted from FIG. 1. The data driver and the touch sensor driver may be integrated into one drive integrated circuit (IC). In a mobile device or a wearable device, the timing controller 130, the power supply 140, the data driver 110, the touch sensor deriver, and the like may be integrated into one drive IC.

The display panel driver may operate in a low-speed driving mode under the control of the timing controller 130. The low-speed driving mode may be set to reduce power consumption of the display device when an input image does not change for a preset time as a result of analyzing the input image. In the low-speed driving mode, the power consumption in the display panel driver and the display panel 100 may be reduced by lowering a refresh rate of the pixels when still images are inputted for a predetermined time or longer. The low-speed driving mode is not limited to a case where the still images are inputted. For example, when the display device operates in a standby mode or when a user command or an input image is not inputted to a display panel driver for a predetermined time or longer, the display panel driver may operate in the low-speed driving mode.

In the display mode, the data driver 110 generates a data voltage by converting pixel data of an input image received as a digital signal from the timing controller 130 with a gamma compensation voltage every frame period through the use of a digital to analog converter (DAC). In the sensing mode, the data driver 110 converts sensing data received as a digital signal from the timing controller 130 into the gamma compensation voltage using the DAC to output a sensing data voltage.

The gamma reference voltage VGMA is divided into gamma compensation voltages for each grayscale through a voltage divider circuit and supplies them to the DAC. The data voltage is outputted through an output buffer from each of the channels of the data driver 110.

Each of the data voltage output channels of the data driver 110 includes a circuit that outputs a data voltage applied to the pixels 101 through the data lines 102. The data driver 110 is configured to output, through a plurality of data voltage output channels, a data voltage of the pixel data in the display mode and a data voltage of the sensing data in the sensing mode. The data driver 110 does not include a sensing channel A conventional data driver 110 for external compensation includes a sensing channel, but the data driver 110 of the present disclosure does not need to include a sensing channel. The sensing channel may be connected to the pixels 101 through a power line to which a reference voltage Vref is applied, and may include an amplifier, an integrator, a sample & holder circuit, and an analog-to-digital converter (ADC). Since the data driver 110 of the present disclosure does not include a sensing channel, it may be implemented with a low-cost drive IC and may be compatible with display devices of other models.

The gate driver 120 may be implemented with a gate in panel (GIP) circuit formed directly on the circuit layer 12 in the display panel 100 together with TFT arrays and wirings in the pixel array. The GIP circuit may be disposed in a bezel (BZ) region, which is a non-display region, of the display panel 100 or may be dispersed in the pixel array in which an input image is reproduced. The gate driver 120 sequentially outputs gate signals to the gate lines 103 under the control of the timing controller 130 in the display mode. The gate driver 120 may sequentially supply the gate signals to the gate lines 103 by shifting the gate signals using a shift register. The gate signals may include a scan pulse, an initialization pulse, and a sensing pulse.

A shift register in the gate driver 120 outputs a pulse of the gate signal in response to a start pulse and a shift clock, and shifts the pulse according to a timing of the shift clock.

The timing controller 130 receives digital video data DATA of an input image, and a timing signal synchronized therewith, from the host system 200. The timing signal may include a vertical synchronization signal Vsync, a horizontal synchronization signal Hsync, a clock CLK, and a data enable signal DE. Because a vertical period and a horizontal period can be known by counting the data enable signal DE, the vertical synchronization signal Vsync and the horizontal synchronization signal Hsync may be omitted. The data enable signal DE has a cycle of one horizontal period (1H).

The host system 200 may be any one of a television (TV) system, a tablet computer, a notebook computer, a navigation system, a personal computer (PC), a home theater system, a mobile device, a wearable device, and a vehicle system. The host system 200 may scale an image signal from the video source to fit the resolution of the display panel 100, and may transmit it to the timing controller 130 together with the timing signal. The host system 200 may include a main power source for generating a DC input voltage supplied to the power supply 140 and a pixel driving voltage ELVDD.

The timing controller 130 may multiply the input frame frequency by i (i is a natural number) in a normal driving mode, so that it can control the operation timing of the display panel driver at a frame frequency of the input frame frequency×i Hz. The input frame frequency is 60 Hz in the National Television Standards Committee (NTSC) system and 50 Hz in the phase-alternating line (PAL) system. In order to lower the refresh rate of pixels in the low-speed driving mode, the timing controller 130 may lower the driving frequency of the display panel driver by lowering the frame frequency to a frequency between 1 Hz and 30 Hz.

The timing controller 130 generates a data timing control signal for controlling the operation timing of the data driver 110, a control signal for controlling the operation timing of the de-multiplexer array 112, and a gate timing control signal for controlling the operation timing of the gate driver 120, based on the timing signals Vsync, Hsync, DE received from the host system. The timing controller 130 controls the operation timing of the display panel driver and synchronizes the data driver 110, the de-multiplexer array 112, the touch sensor driver, and the gate driver 120.

The gate timing control signal outputted from the timing controller 130 may be supplied to a level shifter (not shown). The level shifter receives the gate timing signal from the timing controller 130 and outputs a start pulse and a shift clock. The start pulse and the shift clock swing between the gate-on voltage VGH and the gate-off voltage VGL. The start pulse and the shift clock outputted from the level shifter are supplied to the gate driver 120.

The current sensing unit 150 (e.g., a current sensing circuit) is connected to a first power line to which the pixel driving voltage ELVDD is applied in the sensing mode and measures a current flowing through the first power line. In the sensing mode, electrical characteristics of the pixels 101 that exist within a preset block size are simultaneously measured. Accordingly, the current sensing unit 150 outputs one current sensing value for each block including the plurality of pixels 101.

Figure 3:
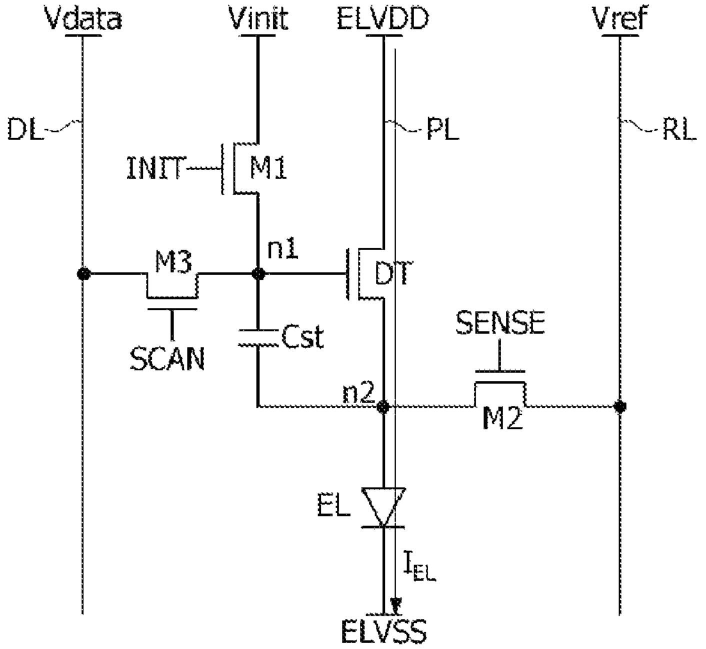
FIG. 3 is a circuit diagram illustrating a pixel circuit and a current flow through the pixel circuit in a display mode according to an embodiment of the present disclosure.
Figure 4:
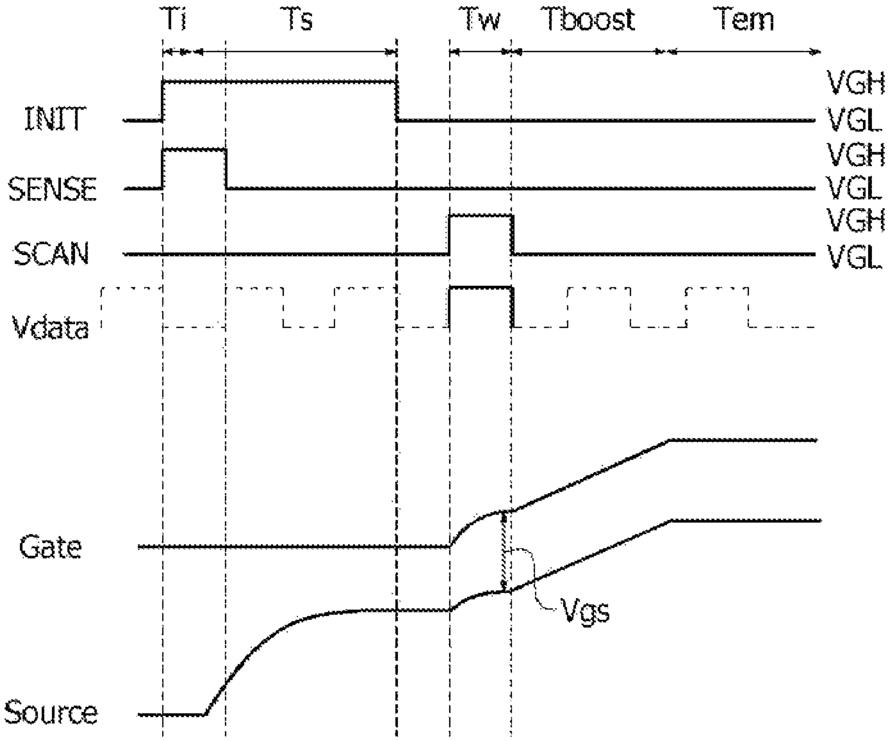
FIG. 4 is a waveform diagram illustrating signals applied to the pixel circuit shown in FIG. 3 and voltages at main nodes in the display mode according to an embodiment of the present disclosure.
Figure 5:
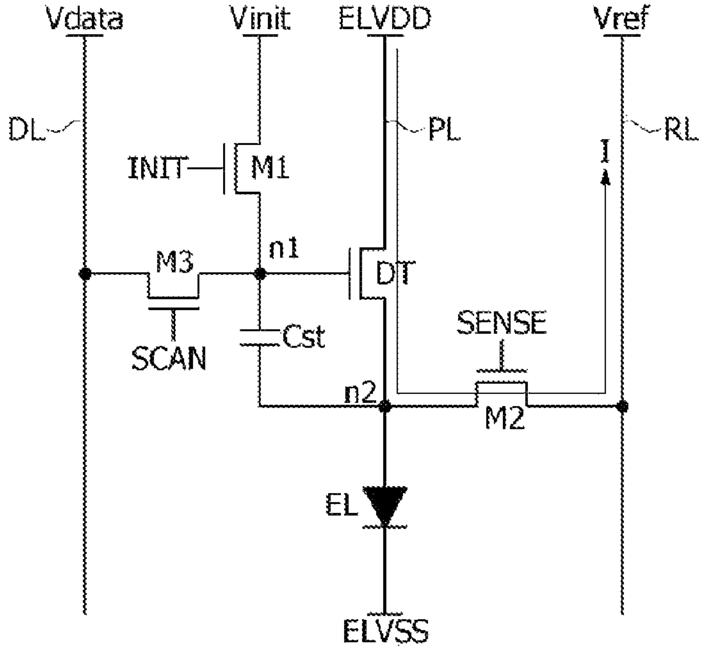
FIG. 5 is a circuit diagram illustrating a current flowing through the pixel circuit shown in FIG. 3 in a sensing mode according to an embodiment of the present disclosure.
Figure 6:
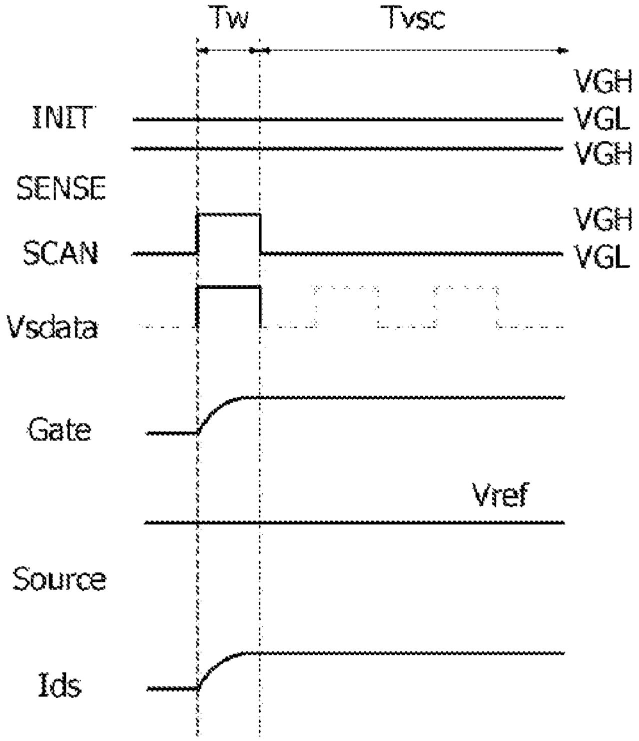
FIG. 6 is a waveform diagram illustrating signals applied to a pixel circuit and voltages at main nodes in the sensing mode according to an embodiment of the present disclosure.

FIG. 3 is a circuit diagram illustrating a pixel circuit and current flowing through the pixel circuit in a display mode according to an embodiment of the present disclosure and FIG. 4 is a waveform diagram illustrating signals applied to the pixel circuit shown in FIG. 3 and voltages at main nodes in the display mode according to an embodiment of the present disclosure. In FIGS. 4 and 6, “Gate” is a voltage at a first node n1, and “Source” is a voltage at a second node n2 in one embodiment. In FIG. 6, “Ids” is a drain-source current of the driving device DT and is the same as a current $I_{EL}$ flowing through the light emitting device EL in the display mode. It should be noted that the pixel circuit shown in FIGS. 3 and 5 is an example of a pixel circuit including an internal compensating circuit, and the pixel circuit of the present disclosure is not limited thereto.

Referring to FIGS. 3 and 4, the pixel circuit includes a light emitting element EL, a driving element DT for driving the light emitting element EL, a plurality of switch elements M1 to M3, and a capacitor Cst. The driving element DT and the switch elements M1 to M3 may be implemented as n-channel oxide TFTs.

The pixel circuit is connected to a first power line PL to which a pixel driving voltage ELVDD is applied, a power line to which a low-potential power supply voltage ELVSS is applied, a power line to which an initialization voltage Vinit is applied, a second power line RL to which a reference voltage Vref is applied, a data line DL to which a data voltage Vdata is applied, and gate lines to which gate signals INIT, SENSE, and SCAN are applied.

As shown in FIG. 4, a driving period of the pixel circuit is divided into an initialization period Ti, a sensing period Ts, a data writing period Tw, a boosting period Tboost, and a light emission period Tem in the display mode. In the initialization period Ti, the pixel circuit is initialized. In the sensing period Ts, a threshold voltage Vth of the driving element DT is sampled and stored in the capacitor Cst. In the data writing period Tw, a data voltage Vdata of pixel data is applied to the first node n1 to which a gate electrode of the driving element DT is connected. In the data writing period Tw, the data voltage Vdata is compensated by the threshold voltage Vth of the driving element DT stored in the capacitor Cst.

In the boosting period Tboost, the first and second nodes n1 and n2 are floated, and voltages at the nodes n1 and n2 are increased. In the light emission period Tem, the light emitting element EL may be supplied with a current IEL generated according to the gate-source voltage Vgs of the driving element DT to emit light with a luminance corresponding to the grayscale value of the pixel data.

In the initialization period Ti, the voltages of an initialization pulse INIT and a sensing pulse SENSE are the gate-on voltage VGH, and the voltage of a scan pulse SCAN is the gate-off voltage VGL. The driving element DT is turned on in the initialization period Ti, and the voltage at the second node n2 increases in the sensing step Ts.

In the sensing period Ts, the voltage of the initialization pulse INIT is the gate-on voltage VGH, and the voltages of the sensing pulse SENSE and the scan pulse SCAN are the gate-off voltage VGL. In the data writing period Tw, the scan pulse SCAN synchronized with the data voltage Vdata of the pixel data is generated at the gate-on voltage VGH. The voltages of the initialization pulse INIT and the sensing pulse SENSE are the gate-off voltage VGL in the data writing step Tw. In the light emission period Tem, the voltages of the gate signals INIT, SENSE, and SCAN are the gate-off voltage VGL.

The constant voltages ELVDD, ELVSS, Vinit, and Vref applied to the pixel circuit may be set to include a voltage margin for the operation in a saturation region of the driving element DT. The initialization voltage Vinit is a voltage less than the pixel driving voltage ELVDD. The reference voltage Vref may be set to a voltage less than the initialization voltage Vinit and higher than the low-potential power supply voltage ELVSS, but is not limited thereto. The reference voltage Vref may be generated at a different voltage in the display mode and the sensing mode. The gate-on voltage VGH may be set to a voltage greater than the pixel driving voltage ELVDD, and the gate-off voltage VGL may be set to a voltage less than the low-potential power supply voltage ELVSS.

The light emitting element EL may be implemented with an OLED in one embodiment. The OLED includes an organic compound layer formed between an anode electrode and a cathode electrode. The organic compound layer may include, but is not limited to, a hole injection layer (HIL), a hole transport layer (HTL), an emission layer (EML), an electron transport layer (ETL), and an electron injection layer (EIL). The anode electrode of the light emitting element EL is connected to the second node n2, and the cathode electrode thereof is connected to the power line to which the low-potential power supply voltage ELVSS is applied. When a voltage is applied to the anode and cathode electrodes of the light emitting element EL, holes passing through the hole transport layer (HTL) and electrons passing through the electron transport layer (ETL) are moved to the emitting layer (EML) to form exciton, and thus visible light is emitted from the emitting layer (EML). An organic light-emitting diode (OLED) used as the light-emitting element EL may be of a tandem structure in which a plurality of light-emitting layers are stacked. An OLED of the tandem structure can improve the luminance and lifespan of pixels.

The driving element DT generates a current $I_{EL}$ according to the gate-source voltage Vgs to drive the light emitting element EL. The driving element DT includes a first electrode connected to the first power line PL, a gate electrode connected to the first node n1, and a second electrode connected to the second node n2.

The capacitor Cst is connected between the first node n1 and the second node n2 to store the gate-source voltage Vgs of the driving element DT.

The first switch element M1 is turned on in response to the gate-on voltage VGH of the first initialization pulse INIT to supply the initialization voltage Vinit to the first node n1, in the initialization step Ti. The first switch element M1 includes a first electrode connected to a power line to which the initialization voltage Vinit is applied, a gate electrode connected to a first gate line to which the initialization pulse INIT is applied, and a second electrode connected to the first node n1.

The second switch element M2 is turned on in response to the gate-on voltage VGH of the sensing pulse SENSE to supply the reference voltage Vref to the second node n2, in the initialization step Ti. The second switch element M2 includes a first electrode connected to the second node n2, a gate electrode connected to a second gate line to which the sensing pulse SENSE is applied, and a second electrode connected to a second power line RL to which the reference voltage Vref is applied.

In the display mode, the reference voltage Vref is set to a voltage for securing a margin of the black grayscale voltage, and thus the voltage may be varied according to the accumulated driving time or the amount of deterioration of the driving element DT. The reference voltage Vref may vary within a preset margin voltage range, for example, between 0 and 3 V, in the display mode.

The third switch element M3 is turned on in response to the gate-on voltage VGH of the scan pulse SCAN synchronized with the data voltage Vdata to connect the data line DL to the first node n1, in the data writing step Tw. The data voltage Vdata is applied to the first node n1 in the data writing step Tw. The third switch element M3 includes a first electrode connected to a data line DL to which the data voltage Vdata is applied, a gate electrode connected to a third gate line to which the scan pulse SCAN is applied, and a second electrode connected to the first node n1.

FIG. 5 is a circuit diagram illustrating a current flowing through the pixel circuit shown in FIG. 3 in a sensing mode according to one embodiment. FIG. 6 is a waveform diagram illustrating signals applied to a pixel circuit and voltages at main nodes in the sensing mode according to one embodiment.

Referring to FIGS. 5 and 6, in the sensing mode, the pixel circuit may be driven without an initialization period Ti, a sensing period Ts, and a boosting period Tboost. Accordingly, the driving period of the pixel circuit may be divided into a data writing period Tw and a non-light emission sensing period Tvsc in the sensing period.

In the data writing period Tw, a preset sensing data voltage Vsdata is commonly applied to the pixels 101 belonging to one block sensed through the data line DL regardless of the pixel data of the input image to the pixel circuit. Since the sensing data voltage Vsdata should be measured by collecting small currents flowing in the pixels 101 in units of blocks through the first power line PL, the sensing data voltage Vsdata may be set to a full white voltage (e.g., white image data) or a full gray voltage of pure colors (R, G, and B) in order to increase the gate-source voltage Vgs of the driving element DT. The full white voltage is a maximum voltage of R, G, and B data applied to the R, G, and B sub-pixels. The full gray voltage of the pure colors is a maximum voltage applied to a sub-pixel having any one of R, G, and B colors.

The sensing pulse SENSE maintains the gate-on voltage VGH during the entire period of the sensing mode. Accordingly, the second switch element M2 maintains an on state for the entire period of the sensing mode, and the current I flows through the second power line RL to which the sensing reference voltage Vref is applied via the second node n2. As a result, in the sensing mode, no current flows through the light emitting elements EL of the pixels 101, so that the pixels 101 is sensed in a non-emission state.

In the non-light emission sensing step Tvsc, the driving element DT maintains an on state, and the currents flowing through the pixels 101 in units of blocks are collected in the first power line PL to which the pixel driving voltage ELVDD is applied, so that the sum of the currents flowing through the pixels 101 included in a corresponding block may be sensed.

Figure 7:
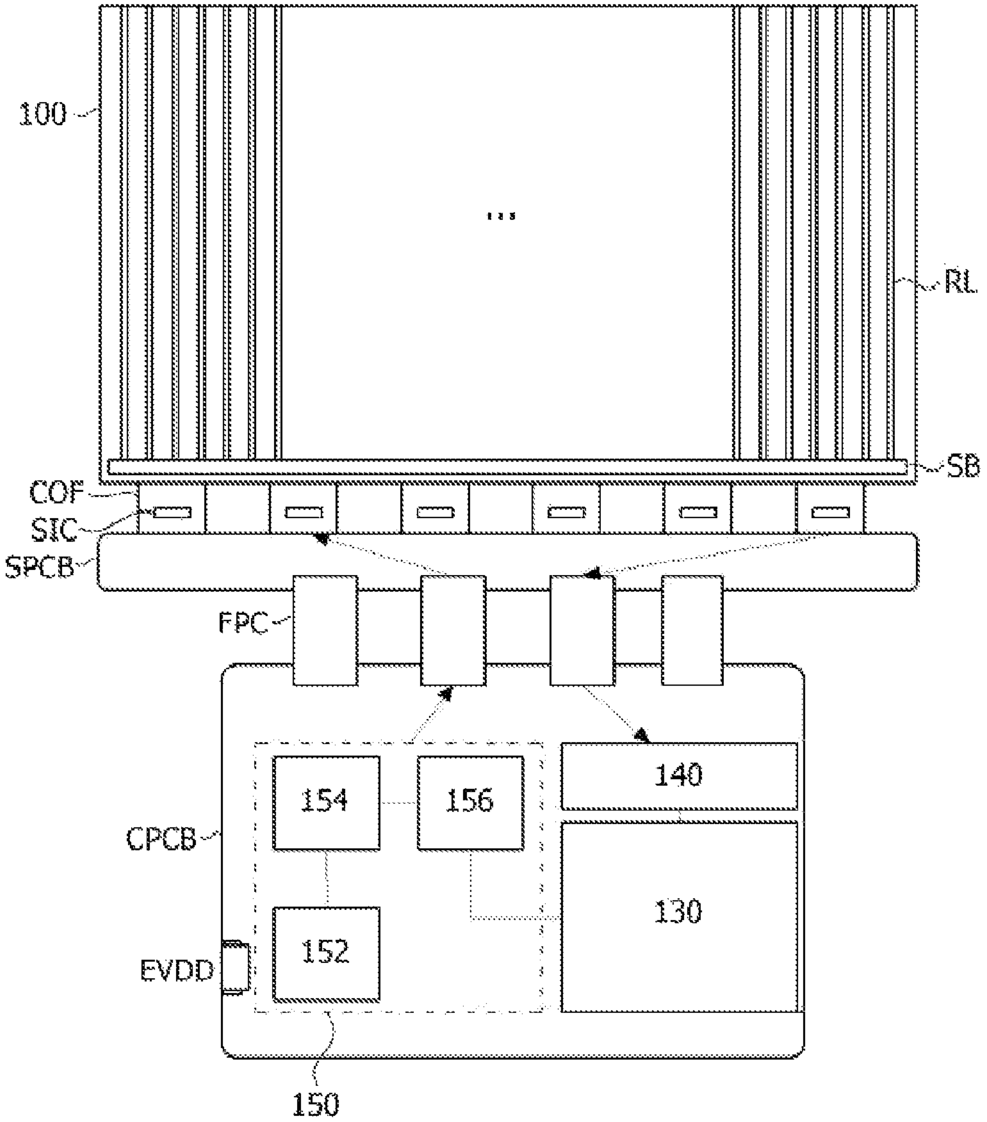
FIG. 7 is a diagram illustrating a control board for controlling a display panel according to an embodiment of the present disclosure.

FIG. 7 is a diagram illustrating a control board CPCB for controlling the display panel 100 according to one embodiment.

Referring to FIG. 7, a chip on film (COF) may be adhered to the display panel 100. The COF includes a drive IC (SIC) and connects a source board SPCB to the display panel 100. The drive IC SIC may include the data driver 110.

The timing controller 130, the power supply 140, and the current sensing unit 150 may be mounted on the control board CPCB. The control board CPCB may be connected to the source board SPCB through a flexible circuit film, for example, a flexible printed circuit (FPC).

The reference voltage Vref outputted from the power supply 140 may be supplied to the display panel 100 via the flexible printed circuit (FPC), the source board SPCB, and the COF.

The second power lines RL on the display panel 100 may be connected to the power supply 140 via the COF, the source board SPCB, and the FPC. All of the second power lines RL on the display panel 100 may be connected to a shorting bar SB. In another embodiment, the shorting bar SB may be divided into a size of blocks within which the pixels 101 can be simultaneously sensed. The shorting bar SB is formed on one side of the display panel 100 and is connected to a dummy wiring of the COF, not an inside of the drive IC SIC mounted on the COF.

The sensing unit 150 (e.g., current sensing circuit) may include a switch element 152 (e.g., circuit) for switching the pixel driving voltage ELVDD, a shunt resistor 154, and an analog-to-digital converter (ADC) 156. The switch element 152 directly applies the pixel driving voltage ELVDD to the first power line PL in the display mode, and connects the pixel driving voltage ELVDD to the shunt resistor 154 connected to the first power line PL in the sensing mode. The shunt resistor 154 and the ADC 156 serve as a current sensor. In the sensing mode, the shunt resistor 154 is connected in series to the first power line PL, and the ADC 156 converts a voltage drop across the shunt resistor 154 into a digital value to output it as current sensing data.

Accordingly, in the sensing mode, the sensing unit 150 senses currents flowing through the pixels 101 in a block that is currently sensed on the control board CPCB using the shunt resistor 154 connected to the first power line PL to which the pixel driving voltage ELVDD is applied. The current sensing data (digital value) measured by the sensing unit 150 is provided to the timing controller 130. The timing controller 130 may generate a compensation value corresponding to the current sensing data for each block received from the sensing unit 150, and may compensate for a change in electrical characteristics of the pixels 101 included in a corresponding block by adding or multiplying the compensation value to pixel data of the input image. The timing controller 130 may improve the resolution of sensing data for each block by using a preset spatial interpolation algorithm so that the boundary between the blocks is not visually recognized.

Figure 8:
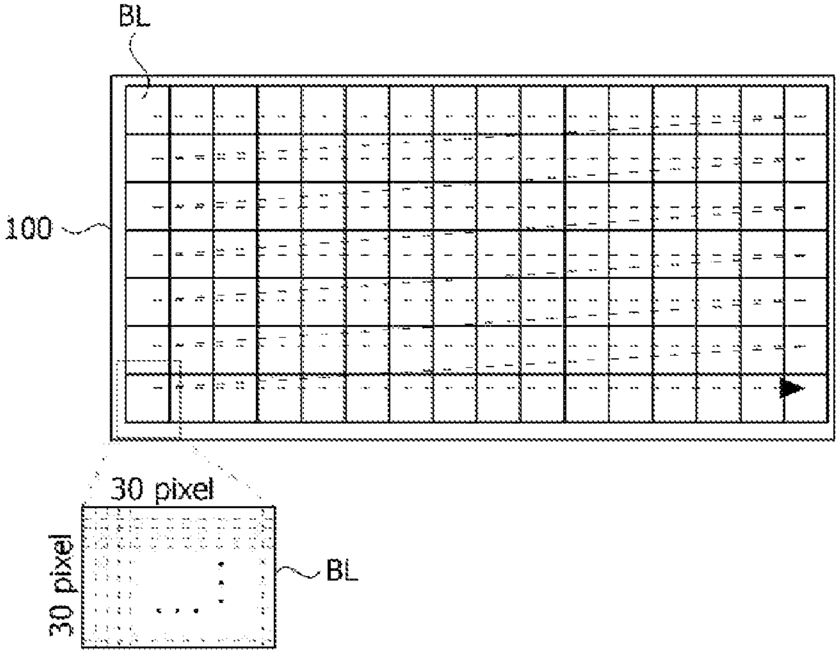
FIG. 8 is a diagram illustrating an example in which pixels are sequentially sensed in units of blocks in a sensing mode according to an embodiment of the present disclosure.

FIG. 8 is a diagram illustrating an example in which pixels are sequentially sensed in units of blocks in a sensing mode according to one embodiment.

Referring to FIG. 8, a screen of the display panel 100 may be virtually divided into blocks BL having a predetermined size and sensed in units of blocks. Each of the blocks BL includes a plurality of pixels 101. For example, a block BL may be set to a size of 30 pixels×30 pixels, but is not limited thereto.

In the sensing mode, the sensing data voltage Vsdata is sequentially applied to the blocks BL in units of blocks. The sensing data voltage Vsdata is applied to the pixels 101 in a target block BL for the current measurement, whereas a black grayscale voltage is applied to the pixels 101 in other blocks BL not being sensed. Since the driving element DT is turned off in the pixels 101 to which the black grayscale voltage is applied, no current flow in the pixels 101. Accordingly, even if all pixels 101 in the screen are commonly connected to the power lines, the currents may be measured in the pixels 101 in a target block BL for the current measurement to which the sensing data voltage Vsdata is applied.

The display panel driver sequentially supplies the sensing data voltage Vsdata to the pixels 101 in units of blocks while shifting the blocks BL for the current measurement in a scanning direction (e.g., in a direction in which the gate lines GL extend), as indicated by an arrow in FIG. 8, under the control of the timing controller 130. After the currents are measured in the sensing mode, a black grayscale voltage is applied to the pixels 101 and the currents flowing in the pixels 101 of other blocks to which the sensing data voltage Vsdata is applied are simultaneously measured.

Figure 9:
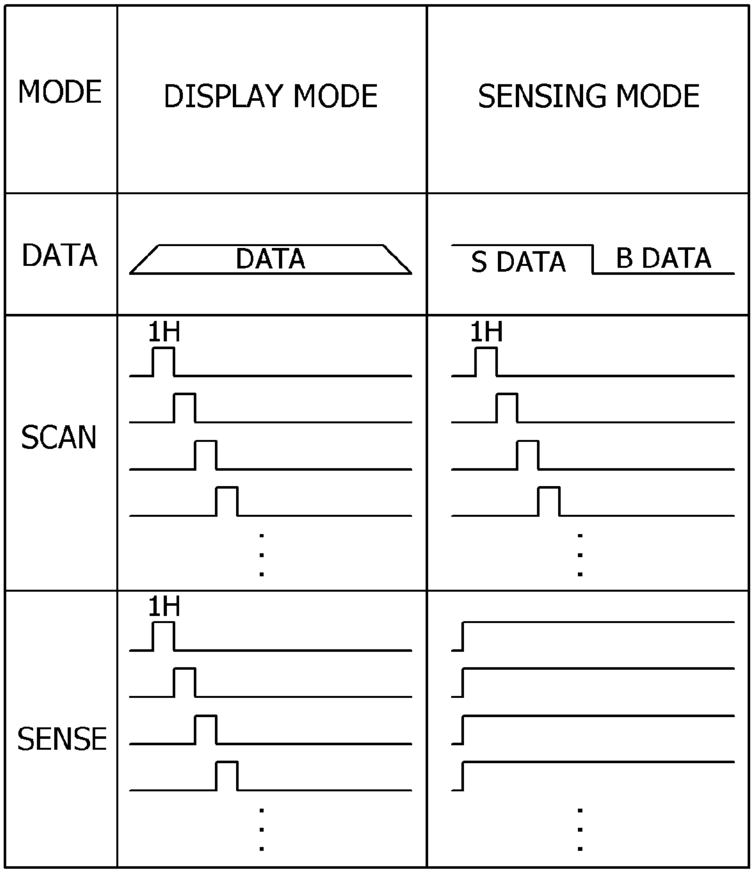
FIG. 9 is a waveform diagram illustrating a driving signal for each mode of a pixel circuit according to an embodiment of the present disclosure.

FIG. 9 is a waveform diagram illustrating a driving signal for each mode of a pixel circuit according to one embodiment. In FIG. 9, the initialization pulse INIT is omitted.

Referring to FIG. 9, in the display mode, the pixel data DATA of an input image is converted into a data voltage Vdata and written to the pixels 101. The pulses of the gate signals INIT, SCAN, and SENSE are sequentially shifted by the shift register in the gate driver 120 in the display mode.

The pulse widths of the scan pulse SCAN and the sensing pulse SENSE may be one horizontal period 1H.

In the sensing mode, the preset sensing data SDATA is converted into a data voltage Vsdata irrespective of the input image and supplied to the pixels 101. In the sensing mode, the initialization pulse INIT and the scan pulse SCAN among the gate signals INIT, SCAN, and SENSE are sequentially shifted in the same manner as in the display mode. The sensing pulse SENSE is maintained at the gate-on voltage VGH without swinging so that the pixels 101 maintains a non-light emission state in the sensing mode.

The timing controller 130 transmits the sensing data (digital data) SDATA to the data driver in order to generate a sensing data voltage Vsdata to be applied to a target block BL for the current measurement in the sensing mode, and transmits black grayscale data to the data driver 110 in order to generate a black grayscale voltage to be applied to the other blocks BL. Accordingly, the data driver 110 may output the data voltage Vdata of the input image in the display mode, while it may output the sensing data voltage Vsdata that swings between the sensing data voltage and the black grayscale voltage in the sensing mode.

The gate driver 120 includes a shift register that outputs the initialization pulse INIT, a shift register that outputs the scan pulse SCAN, and a shift register that outputs the sensing pulse SENSE.

Figure 10:
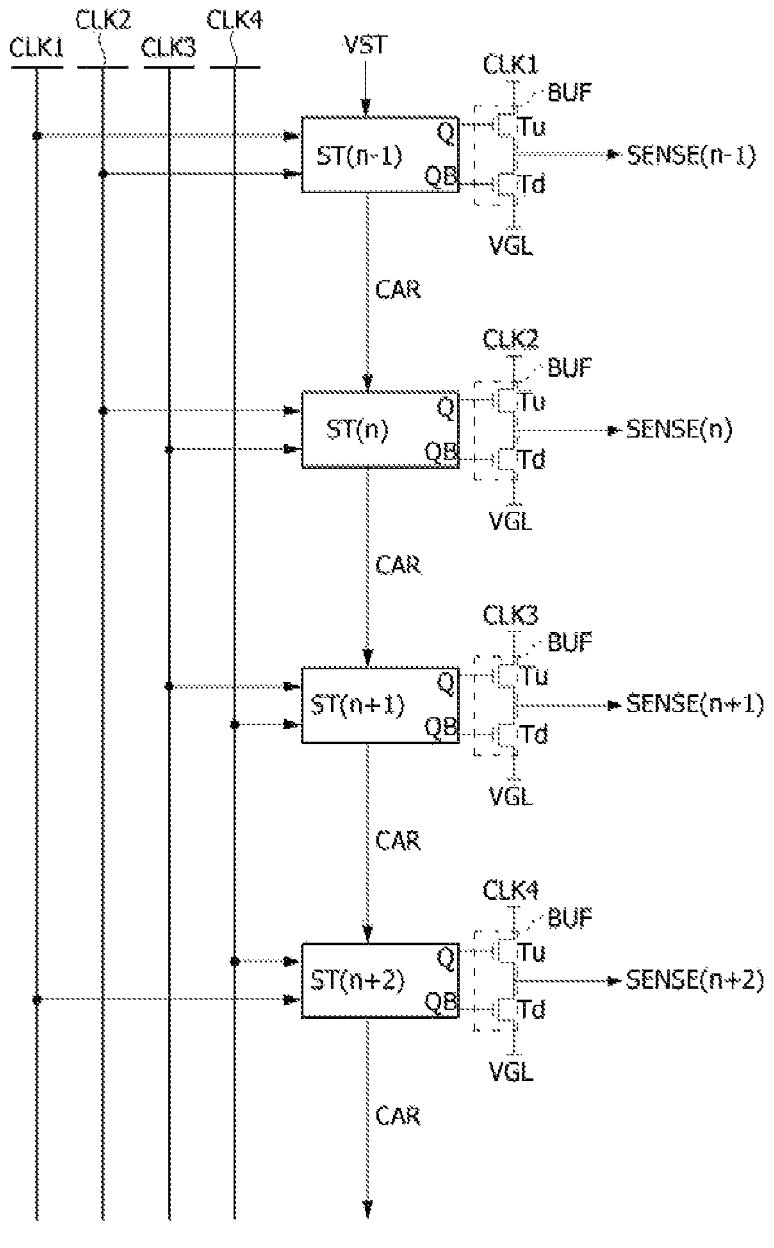
FIG. 10 shows an example of a shift register that outputs a sensing pulse according to an embodiment of the present disclosure.

FIG. 10 shows an example of a shift register that outputs the sensing pulse SENSE according to one embodiment.

Referring to FIG. 10, the shift register includes signal transfer units [ST(n−1) to ST(n+2)] (e.g., signal transfer circuits) that are dependently connected to one another. Each of the signal transfer units [ST(n−1) to ST(n+2)] includes a VST node to which a start signal VST is inputted, a CLK node to which a shift clock [CLK1 to CLK4] is inputted, a first output node from which a sensing pulse [SENSE(n−1) to SENSE(n+2)] are outputted, and a second output node from which a carry signal CAR is outputted.

The start signal VST is generally inputted to a first signal transfer unit. In FIG. 10, the n−1th signal transfer unit [ST(n−1)] may be the first signal transfer unit. The shift clocks CLK1 to CLK4 may be 4-phase clocks, but are not limited thereto.

The signal transfer units [ST(n) to ST(n+2)] dependently connected to the (n−1)th signal transfer unit [ST(n−1)] start to be driven by receiving a carry signal CAR as a start signal from their respective preceding signal transfer units. Each of the signal transfer units [ST(n−1) to ST(n+2)] outputs a sensing pulse [SENSE(n−1) to SENSE(n+2)] through its first output node, and at the same time, outputs a carry signal CAR through its second output node.

Each of the signal transfer units [ST(n−1) to ST(n+2)] includes a first control node Q, a second control node QB, and a buffer BUF. The buffer BUF outputs a gate signal to a gate line through the first output node via a pull-up transistor Tu (e.g., a first transistor) and a pull-down transistor Td (e.g., a second transistor).

The buffer BUF supplies the voltage of the shift clock [CLK1 to CLK4] to the first output node to raise the voltage at the first output node when the shift clock [CLK1 to CLK4] is inputted thereto while the first control node Q is charged, and discharges the first output node to lower the sensing pulse [SENSE(n−1)~SENSE(n+2)] when the second control node QB is charged.

The pull-up transistor Tu includes a gate electrode connected to the first control node Q, a first electrode connected to a CLK node to which the shift clock [CLK1 to CLK4] is inputted, and a second electrode connected to the first output node. The pull-down transistor Td includes a gate electrode connected to the second control node QB, a first electrode connected to the first output node, and a second electrode connected to the VSS node to which the low-potential reference voltage SEVSS or gate off voltage VGL is applied.

An inverter circuit is connected between the first control node Q and the second control node QB. Therefore, the voltage at the second control node QB is a low voltage when the voltage at the first control node Q is a high voltage, and the voltage at the second control node QB is a high voltage when the voltage at the first control node Q is a low voltage.

When the voltage at the first control node Q is charged and the high voltage of the shift clock [CLK1 to GCLK4] is inputted, the pull-up transistor Tu is turned on to charge the voltage at the first output node up to the gate-on voltage VGH. When the voltage of the shift clock [CLK1 to GCLK4] rises to the gate-on voltage VGH, the voltage at the first control node Q is bootstrapped to a voltage higher than the gate-on voltage VGH. When the voltage at the first control node Q becomes greater than the threshold voltage of the pull-up transistor Tu, the pull-up transistor Tu is turned on to charge the first output node.

The voltage at the second control node QB is discharged to the gate-off voltage VGL when the first control node Q is charged to a voltage equal to or higher than the gate-on voltage VGH. When the voltage at the second control node QB is charged to the gate-on voltage VGH, the pull-down transistor Td is turned on to supply the gate-off voltage VGH to the first output node so that the gate line is discharged. In this case, the voltage of the sensing pulse [SENSE(n−1) to SENSE(n+2)] is lowered up to the gate-off voltage VGL.

Figure 11A:
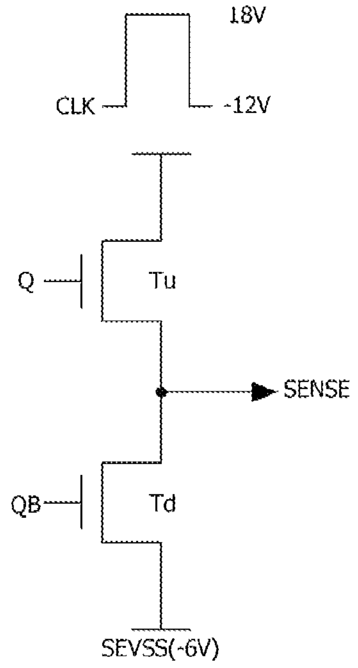
FIG. 11A is a diagram illustrating voltages applied to a CLK node and a VSS node connected to the buffer shown in FIG. 10 in the display mode according to an embodiment of the present disclosure.

A voltage inputted to the buffer BUF of the shift register may vary for each mode. As shown in FIG. 11A, in the display mode, the voltage at the CLK node connected to the buffer BUF may swing between the gate-on voltage VGH and the gate-off voltage VGL by the shift clock [CLK1 to CLK4]. As shown in FIG. 11A, in the display mode, the low-potential reference voltage SEVSS is maintained at the gate-off voltage VGL. For example, in the display mode, as shown in FIG. 11A, a shift clock CLK that swings between 18V and −12V may be inputted to the pull-up transistor Tu, and a low-potential reference voltage SEVSS of −6V may be applied to the VSS node connected to the pull-down transistor Td. The pull-up transistor Tu charges the first output node with the voltage at the CLK node when the first control node Q is charged with a high voltage, whereas the pull-down transistor Td discharges the first output node up to the low-potential reference voltage SEVSS when the second control node QB is charged with a high voltage. Accordingly, in the display mode, the shift register outputs the sensing pulse [SENSE(n−1)] to SENSE(n+2)] through the first output node.

Figure 11B:
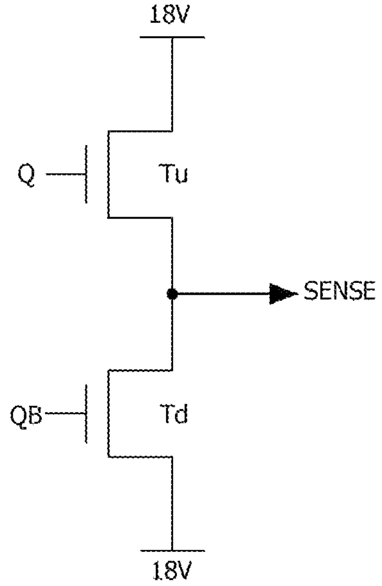
FIG. 11B is a diagram illustrating voltages applied to a CLK node and a VSS node connected to the buffer shown in FIG. 10 in the sending mode according to an embodiment of the present disclosure.

As shown in FIG. 11B, the voltage at the CLK node and the VSS node connected to the buffer BUF is gate-on voltage VGH, for example, 18V in the sensing mode. Accordingly, since the transistors Tu and Td in the buffer BUF are alternately turned on according to the voltages at the first and second control nodes Q and QB which are alternately charged, respectively, the voltage at the first output node from which the sensing pulse [SENSE(n−1)] to SENSE(n+2)] is outputted in the sensing mode maintains the gate-on voltage VGH. As a result, the second switch elements M2 in the pixels 101 are maintained in an on state during the period of the sensing mode so that the currents of the pixels 101 are discharged through the second power line RL, and thus the pixels 101 are sensed in a non-light emission state.

Figure 12:
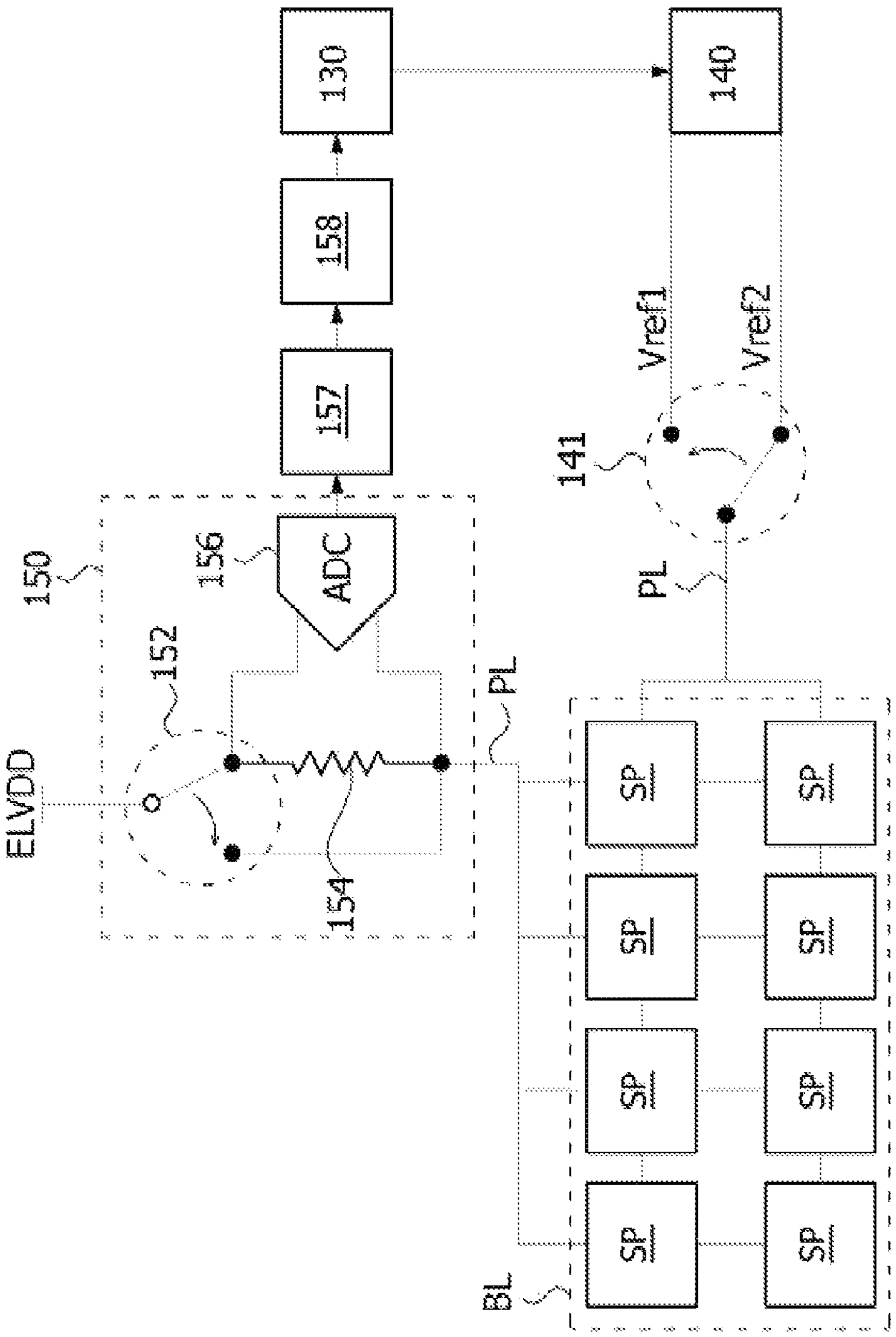
FIG. 12 is a diagram illustrating in detail a current sensing unit according to an embodiment of the present disclosure.

FIG. 12 is a diagram illustrating in detail a current sensing unit 150 according to an embodiment of the present disclosure. In FIG. 12, "SP" denotes sub-pixels in a sensing target block BL for example.

Referring to FIG. 12, the switch element 152 (e.g., switch circuit) connects a VDD node to which the pixel driving voltage ELVDD is applied in a display mode to the first power line PL. In the display mode, the pixel driving voltage ELVDD is applied to the pixels 101 without passing through the shunt resistor 154. The switch element 152 connects the VDD node to the shunt resistor 154 in the sensing mode.

In the sensing mode, the pixel driving voltage ELVDD is applied to the pixels 101 through the shunt resistor 154 and the first power line PL, so that a current flowing in the pixels 101 in the sensing target block BL flows through the first power line PL and the shunt resistor 154. In this case, a voltage drop occurs at the shunt resistor 154 and a voltage across the shunt resistor 154 is inputted to the ADC 156, so that a current flowing through the first power line PL is sensed.

The display device of the present disclosure may further include a configuration register 157 and a communication unit 158 connected between the ADC 156 and the timing controller 130.

The configuration register 157 includes a power register having a preset power value according to an output signal (digital value) from the ADC 156, a current register having a preset current value for each bit of the output signal from the ADC, and an alert register having a preset alarm situation. The configuration register 157 may be omitted in other embodiments.

The communication unit 158 transmits an output signal from the ADC 156 to the timing controller 130, or an output signal from the ADC 156 received through the configuration register 157 to the timing controller 130. The communication unit 158 may be implemented with an I2C or SMBus interface circuit, but is not limited thereto.

The timing controller 130 determines the current of the sensing target block BL based on the output signal of the ADC 156 received through the communication unit 158 and generates a compensation value corresponding to the value of the current. The timing controller 130 may read data that has been set in the configuration register 157 to determine a current value of the first power line PL from an output signal of the ADC 156, and may determine whether a variation in the pixel driving voltage ELVDD and an input voltage to the ADC 156 exceed a preset voltage range.

The display device of the present disclosure may further include a reference voltage switch element 141. The power supply 140 may output a first reference voltage Vref1 to be supplied to the pixels 101 in the display mode and a second reference voltage Vref2 to be supplied to the pixels 101 in the sensing mode. The first reference voltage Vref1 may be set to a voltage for securing a margin of the black grayscale voltage for the pixels 101 such that it may be varied between 0V and 3V depending on the accumulated driving time or the amount of deterioration of the driving element DT. The second reference voltage Vref2 may be set to a constant voltage for the pixels 101, for example, a ground voltage (GND=0V), in the sensing mode.

The timing controller 130 may control the output voltage of the power supply 140 for each mode and control the reference voltage switch element 141. The reference voltage switch element 141 supplies the first reference voltage Vref1 to the second power line RL in the display mode and supplies the second reference voltage Vref2 to the second power line RL in the sensing mode, under the control of the timing controller 130.

The pixel driving voltage ELVDD may be changed for each mode under the control of the timing controller 130 or the host system 200. For example, the pixel driving voltage ELVDD may be a voltage higher than a voltage set in the display mode to increase a current flowing in the pixels 101 in the sensing mode. The pixel driving voltage ELVDD may be changed according to a change in a load.

Figure 13:
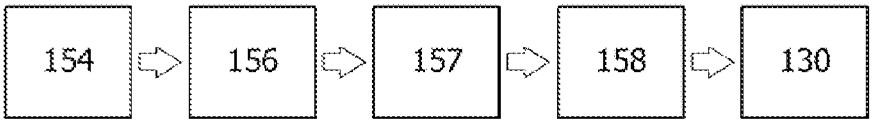
FIG. 13 is a diagram illustrating a connection structure between a shunt resistor and an analog-to-digital converter (ADC) according to an embodiment of the present disclosure.
Figure 14:
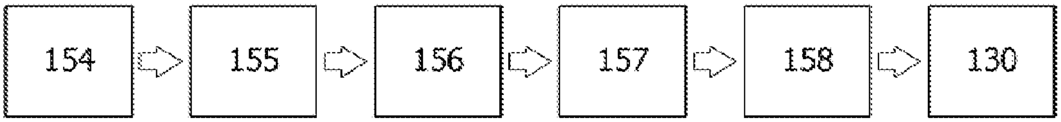
FIG. 14 is a diagram illustrating how to connect a shunt resistor and an ADC according to another embodiment of the present disclosure.

FIG. 13 is a diagram illustrating a connection structure between a shunt resistor and an ADC according to an embodiment of the present disclosure. FIGS. 14 to 15C are diagrams illustrating how to connect a shunt resistor and an ADC according to other embodiments of the present disclosure.

When a pixel driving voltage ELVDD is fixed to a specific voltage, the shunt resistor 154 may be directly connected to the ADC 156 as shown in FIG. 13.

When a pixel driving voltage ELVDD is changed or it is varied for each mode, a switch element 155 for measuring an input voltage to the ADC may be connected between the shunt resistor 154 and the ADC 156. The switch element 155 may change over between contact points of the classification resistor 154 and the input terminal of the ADC under the control of the timing controller 130.

Figure 15A:
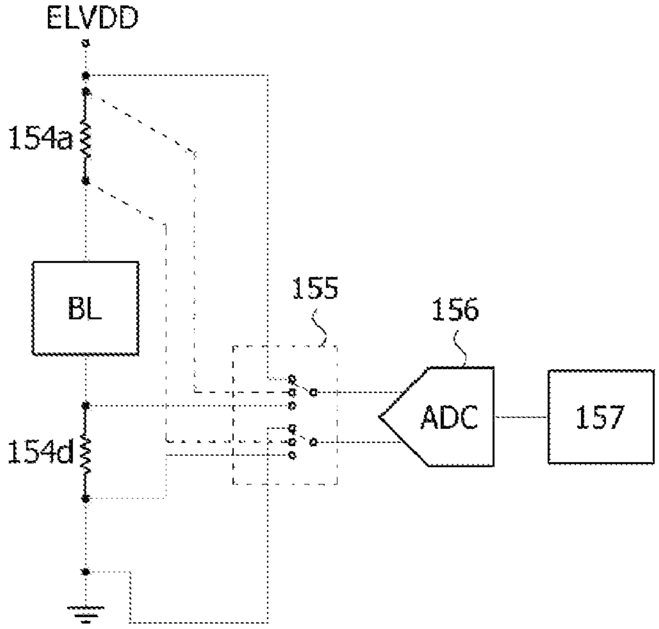
FIGS. 15A to 15C are circuit diagrams illustrating the switch element and the two shunt resistors shown in FIG. 14 according to the other of the present disclosure.
Figure 15B:
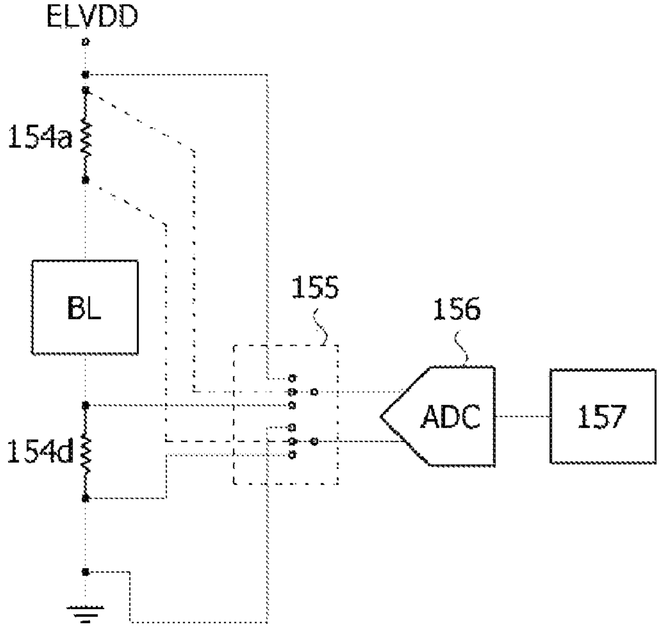
Figure 15C:
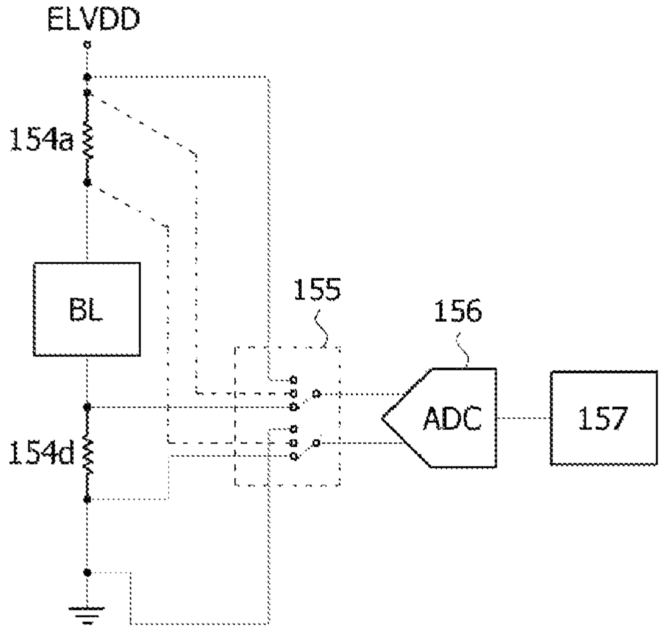

As shown in FIGS. 15A to 15C, the shunt resistor 154 includes a high-potential shunt resistor **154*a* connected between the pixel driving voltage ELVDD and a load and a low-potential shunt resistor 154*d*** connected between the load and the ground voltage GND. The load may be the sensing target block BL in the sensing mode.

The switch element 155 may connect the pixel driving voltage ELVDD and the ground voltage GND to first and second input terminals of the ADC 156, as shown in FIG. 15A. Therefore, the timing controller 130 may determine the pixel driving voltage ELVDD and the range of the input voltage to the ADC. When the voltage difference across the first shunt resistor **154*a* is within the range of the input voltage to the ADC 156, the timing controller 130 controls the switch element 155 to connect the first shunt resistor 154*a* to the first and second input terminals of the ADC 156 as shown in FIG. 15B. On the other hand, when the pixel driving voltage ELVDD rises and an overflow voltage exceeding the range of the input voltage to the ADC 156 is applied to the ADC 156, the timing controller 130 may control the switch element 155 to connect the second shunt resistor 154*d* to the first and second input terminals of the ADC 156**.

In one embodiment, a display device comprises: a plurality of pixels connected to power lines to which a pixel driving voltage and a reference voltage are applied, a plurality of data lines to which data voltages of pixel data of an input image is applied, and a plurality of gate lines to which a gate signal is applied; a display panel driver configured to write the pixel data of the input image to the plurality of pixels during a display mode of the display device, and to write preset sensing data to the plurality of pixels during a sensing mode of the display device; and a sensing circuit configured to simultaneously sense the plurality of the pixels by measuring a current flowing through a first power line from the plurality of power lines to which the pixel driving voltage is applied to the plurality of pixels during the sensing mode, wherein the display panel driver includes: a data driver configured to output, through a plurality of data voltage output channels, the data voltages of the pixel data during the display mode and data voltages of the preset sensing data during the sensing mode; and a gate driver configured to output the gate signal.

In one embodiment, the data driver lacks a sensing channel for sensing the plurality of pixels.

In one embodiment, the display device further comprises: a power supply configured to output the pixel driving voltage, the reference voltage, an initialization voltage, and a low-potential power supply voltage; and a timing controller configured to supply the pixel data of the input image and the sensing data to the data driver, control an operation timing of the data driver, and generate a compensation value corresponding to sensed data inputted from the sensing unit.

In one embodiment, the plurality of pixels are connected to a second power line from the plurality of power lines to which the initialization voltage is applied; wherein a driving period of the plurality of pixels during the display mode includes an initialization period, a sensing period, a first data writing period, a boosting period, and a light emission period, and the driving period of the plurality of pixels during the sensing mode includes a second data writing period and a non-light emission sensing period.

In one embodiment, the gate signal includes: an initialization pulse generated at an on voltage in the initialization period and the sensing period, and generated at an off voltage in the first data writing period, the second data writing period, the boosting period, the light emission period, and the non-light emission sensing period; a sensing pulse generated at the on voltage in the initialization period, generated at the off voltage in the sensing period, the first data writing period, the boosting period, and the light emission period of the display mode, and generated at the on voltage during the second data writing period and the non-light emission period of the sensing mode; and a scan pulse generated at the on voltage and is synchronized with the data voltage in the first data writing period and is synchronized with the data voltage in the second data writing period, and generated at the off voltage in the initialization period, the sensing period, the boosting period, the light emission period, and the non-light emission sensing period.

In one embodiment, each of the plurality of pixels includes: a driving element including a first electrode of the driving element that is connected to the first power line to which the pixel driving voltage is applied, a gate electrode of the driving element that is connected to a first node, and a second electrode of the driving element that is connected to a second node; a light emitting element including an anode connected to the second node and a cathode to which the low-potential power supply voltage is applied; a capacitor between the first node and the second node; a first switch element including a first electrode of the first switch element to which the initialization voltage is applied, a gate electrode of the first switch element to which the initialization pulse is applied, and a second electrode of the first switch element that is connected to the first node; a second switch element including a first electrode of the second switch element that is connected to the second node, a gate electrode of the second switch element to which the sensing pulse is applied, and a second electrode of the second switch element that is connected to a third power line from the plurality of power lines to which the reference voltage is applied; and a third switch element including a first electrode of the third switch element that is connected to a data line to which the data voltage is applied, a gate electrode of the third switch element to which the scan pulse is applied, and a second electrode of the third switch element that is connected to the first node.

In one embodiment, a current flows through the light emitting element in the light emission period of the display mode, during the second data writing period and the non-light emission sensing period of the sensing mode, a current flows through the second node, the second switch element, and the third power line, but the light emitting element does not emit light.

In one embodiment, the sensing circuit includes: a resistor; a switch element configured to connect the resistor to the first power line in series during the sensing mode, and configured to disconnect the resistor from the first power line during the display mode; and an analog-to-digital converter connected to the resistor in parallel, the analog-to-digital converter configured to convert a voltage difference across the resistor into a digital value during the sensing mode, the voltage difference indicative of the current flowing through the first power line during the sensing mode.

In one embodiment, the gate driver includes: a shift register configured to output the sensing pulse, the shift register including a plurality of signal transfer units that each include: a first transistor including a gate electrode of the first transistor that is connected to a first control node of the signal transfer unit, a first electrode of the first transistor connected to a clock node, and a second electrode of the first transistor connected to an output node from which the sensing pulse is outputted; and a second transistor including a gate electrode of the second transistor coupled to a second control node of the signal transfer unit, a first electrode of the second transistor connected to the output node, and a second electrode of the second transistor connected to a voltage node, and wherein during the display mode, a clock that switches between the on voltage and the off voltage is inputted to the clock node, a low-potential reference voltage is applied to the voltage node, and during the sensing mode, the on voltage is applied to each of the clock node and the voltage node.

In one embodiment, the reference voltage includes: a first reference voltage that changes within a preset voltage range as an accumulated driving time of the plurality of pixels elapses during the display mode; and a second reference voltage is a substantially constant predetermined voltage within the preset voltage range during the sensing mode.

In one embodiment, the display device further comprises: a reference voltage switch configured to apply the first reference voltage to the third power line connected to the plurality of pixels during the display mode and to apply the second reference voltage to the third power line during the sensing mode.

In one embodiment, a display device comprises: a display panel including a plurality of pixels that are connected to a power line to which a pixel driving voltage is supplied, the plurality of pixels divided into a plurality of rows of pixel blocks that extend along a first direction and each pixel block including a different subset of pixels from the plurality of pixels; a plurality of data lines that are connected to the plurality of pixels, the plurality of data lines extending along a second direction that intersects the first direction; a plurality of gate lines that are connected to the plurality of pixels and extend along the first direction, the plurality of gate lines applying gate signals to the plurality of pixels; a display panel driver configured to supply a plurality of data voltages of an image to the plurality of data lines during a display mode, and to supply sensing data to the plurality of data lines during a sensing mode; and a sensing circuit configured to sense current flowing through the power line that is connected to a respective subset of pixels included in each pixel block included in a row of pixel blocks during the sensing mode, each of the respective subset of pixels included in each pixel block supplied the sensing data during the sensing mode.

In one embodiment, the sensing circuit sequentially senses each pixel block included in the row of pixel blocks during the sensing mode such that the respective subset of pixels included in the pixel block are supplied the sensing data and are simultaneously sensed based on the sensed current flowing through the power line according to the sensing data.

In one embodiment, the sensing data comprises white image data and the display panel driver is configured to supply the white image data to a target pixel block from the row of pixel blocks that is being sensed and supplies black image data to remaining pixel blocks included in the row of pixel blocks that are not being sensed.

In one embodiment, a current flows through light emitting elements included in the plurality of pixels during the display mode, but the current does not flow through the light emitting elements during the sensing mode.

In one embodiment, the sensing circuit includes: a resistor; a switch configured to connect the resistor to the power line in series during the sensing mode and configured to disconnect the resistor from the power line during the display mode; and an analog-to-digital converter connected to the resistor in parallel, the analog-to-digital converter configured to convert a voltage difference across the resistor into a digital value during the sensing mode, the voltage difference indicative of the current flowing through the power line during the sensing mode.

In one embodiment, the resistor includes: a first resistor connected between the pixel driving voltage and at least one pixel block from the plurality of rows of pixel blocks; and a second resistor connected between a ground voltage and the at least one pixel block, wherein during the sensing mode, the switch element is configured to supply to input terminals of the analog-to-digital converter a voltage difference between the pixel driving voltage and the ground voltage, and the switch element is configured to supply to the input terminals a voltage difference across the first resistor responsive to the voltage difference between the pixel driving voltage and the ground voltage being within a predetermined voltage range, and the switch element is configured to supply to the input terminals of the analog-to-digital converter a voltage difference across the second resistor responsive to either the voltage difference between the pixel driving voltage and the ground exceeding the predetermined voltage range or the voltage difference across the first resistor exceeding the predetermined voltage range.

In one embodiment, a sensing circuit comprises: a resistor; and a switch configured to serially connect the resistor to a power line that supplies a pixel driving voltage to a plurality of pixels of a display panel during a sensing period, and configured to disconnect the resistor from the power line during a display period during which an image is displayed by the display panel, wherein the sensing circuit is configured to simultaneously sense a subset of pixels from the plurality of the pixels during the sensing period by measuring a current flowing through the power line responsive to sensing data being applied to the subset of pixels during the sensing mode.

In one embodiment, the resistor includes: a first resistor connected between the pixel driving voltage and at least one pixel block from the plurality of rows of pixel blocks; and a second resistor connected between a ground voltage and the at least one pixel block, wherein during the sensing mode, the switch element is configured to supply to input terminals of the analog-to-digital converter a voltage difference between the pixel driving voltage and the ground voltage, and the switch element is configured to supply to the input terminals a voltage difference across the first resistor responsive to the voltage difference between the pixel driving voltage and the ground voltage being within a predetermined voltage range, and the switch element is configured to supply to the input terminals of the analog-to-digital converter a voltage difference across the second resistor responsive to either the voltage difference between the pixel driving voltage and the ground exceeding the predetermined voltage range or the voltage difference across the first resistor exceeding the predetermined voltage range.

In one embodiment, a sensing circuit comprises: a resistor; and a switch configured to serially connect the resistor to a power line that supplies a pixel driving voltage to a plurality of pixels of a display panel during a sensing period, and configured to disconnect the resistor from the power line during a display period during which an image is displayed by the display panel, wherein the sensing circuit is configured to simultaneously sense a subset of pixels from the plurality of the pixels during the sensing period by measuring a current flowing through the power line responsive to sensing data being applied to the subset of pixels during the sensing mode.

In one embodiment, the sensing circuit further comprises: an analog-to-digital converter connected to the resistor in parallel, the analog-to-digital converter configured to convert a voltage difference across the resistor into a digital value during the sensing mode responsive to the current flowing through the power line.

In one embodiment, pixel data of the image is adjusted by a compensation value based on the digital value.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device comprising:

a plurality of pixels connected to a plurality of power lines to which a pixel driving voltage and a reference voltage are applied, a plurality of data lines to which data voltages of pixel data of an input image are applied, and a plurality of gate lines to which a gate signal is applied;

a display panel driver configured to write the pixel data of the input image to the plurality of pixels during a display mode of the display device, and to write preset sensing data to the plurality of pixels during a sensing mode of the display device; and a sensing circuit configured to simultaneously sense the plurality of pixels by measuring a current flowing through a first power line from the plurality of power lines to which the pixel driving voltage is applied to the plurality of pixels during the sensing mode;

a power supply configured to output the pixel driving voltage, the reference voltage, an initialization voltage, and a low-potential power supply voltage; and a timing controller configured to supply the pixel data of the input image and the sensing data to the display panel driver, control an operation timing of the display panel driver, and generate a compensation value corresponding to sensed data inputted from the sensing circuit, wherein the display panel driver includes:

a data driver configured to output, through a plurality of data voltage output channels, the data voltages of the pixel data during the display mode and data voltages of the preset sensing data during the sensing mode; and a gate driver configured to output the gate signal, wherein the plurality of pixels are connected to a second power line from the plurality of power lines to which the initialization voltage is applied;

wherein a driving period of the plurality of pixels during the display mode includes an initialization period, a sensing period, a first data writing period, a boosting period, and a light emission period, and the driving period of the plurality of pixels during the sensing mode includes a second data writing period and a non-light emission sensing period.

2. The display device of claim 1, wherein the gate signal includes:

an initialization pulse generated at an on voltage in the initialization period and the sensing period, and generated at an off voltage in the first data writing period, the second data writing period, the boosting period, the light emission period, and the non-light emission sensing period;

a sensing pulse generated at the on voltage in the initialization period, generated at the off voltage in the sensing period, the first data writing period, the boosting period, and the light emission period of the display mode, and generated at the on voltage during the second data writing period and the non-light emission sensing period of the sensing mode; and a scan pulse generated at the on voltage and is synchronized with the data voltage in the first data writing period and is synchronized with the data voltage in the second data writing period, and generated at the off voltage in the initialization period, the sensing period, the boosting period, the light emission period, and the non-light emission sensing period.

3. The display device of claim 2, wherein each of the plurality of pixels includes:

a driving element including a first electrode of the driving element that is connected to the first power line to which the pixel driving voltage is applied, a gate electrode of the driving element that is connected to a first node, and a second electrode of the driving element that is connected to a second node;

a light emitting element including an anode connected to the second node and a cathode to which the low-potential power supply voltage is applied;

a capacitor between the first node and the second node;

a first switch element including a first electrode of the first switch element to which the initialization voltage is applied, a gate electrode of the first switch element to which the initialization pulse is applied, and a second electrode of the first switch element that is connected to the first node;

a second switch element including a first electrode of the second switch element that is connected to the second node, a gate electrode of the second switch element to which the sensing pulse is applied, and a second electrode of the second switch element that is connected to a third power line from the plurality of power lines to which the reference voltage is applied; and a third switch element including a first electrode of the third switch element that is connected to a data line to which the data voltage is applied, a gate electrode of the third switch element to which the scan pulse is applied, and a second electrode of the third switch element that is connected to the first node.

4. The display device of claim 3, wherein the sensing circuit includes:

a resistor;

a switch element configured to connect the resistor to the first power line in series during the sensing mode, and configured to disconnect the resistor from the first power line during the display mode; and an analog-to-digital converter connected to the resistor in parallel, the analog-to-digital converter configured to convert a voltage difference across the resistor into a digital value during the sensing mode, the voltage difference indicative of the current flowing through the first power line during the sensing mode.

5. The display device of claim 4, wherein the reference voltage includes:

a first reference voltage that changes within a preset voltage range as an accumulated driving time of the plurality of pixels elapses during the display mode; and a second reference voltage is a substantially constant predetermined voltage within the preset voltage range during the sensing mode.

6. The display device of claim 5, further comprising:

a reference voltage switch configured to apply the first reference voltage to the third power line connected to the plurality of pixels during the display mode and to apply the second reference voltage to the third power line during the sensing mode.

7. The display device of claim 3, wherein a current flows through the light emitting element in the light emission period of the display mode, during the second data writing period and the non-light emission sensing period of the sensing mode, a current flows through the second node, the second switch element, and the third power line, but the light emitting element does not emit light.

8. The display device of claim 2, wherein the gate driver includes:

a shift register configured to output the sensing pulse, the shift register including a plurality of signal transfer units that each include:

a first transistor including a gate electrode of the first transistor that is connected to a first control node of the signal transfer unit, a first electrode of the first transistor connected to a clock node, and a second electrode of the first transistor connected to an output node from which the sensing pulse is outputted; and a second transistor including a gate electrode of the second transistor coupled to a second control node of the signal transfer unit, a first electrode of the second transistor connected to the output node, and a second electrode of the second transistor connected to a voltage node, and wherein during the display mode, a clock that switches between the on voltage and the off voltage is inputted to the clock node, a low-potential reference voltage is applied to the voltage node, and during the sensing mode, the on voltage is applied to each of the clock node and the voltage node.

9. The display device of claim 1, wherein the data driver lacks a sensing channel for sensing the plurality of pixels.

10. A display device comprising:

a display panel including a plurality of pixels that are connected to a power line to which a pixel driving voltage is supplied, the plurality of pixels divided into a plurality of rows of pixel blocks that extend along a first direction and each pixel block including a different subset of pixels from the plurality of pixels where the different subset of pixels in the pixel block are arranged in a plurality of columns of pixels within the pixel block;

a plurality of data lines that are connected to the plurality of pixels, the plurality of data lines extending along a second direction that intersects the first direction;

a plurality of gate lines that are connected to the plurality of pixels and extend along the first direction, the plurality of gate lines applying gate signals to the plurality of pixels;

a display panel driver configured to supply a plurality of data voltages of an image to the plurality of data lines during a display mode, and to supply sensing data to the plurality of data lines during a sensing mode; and a sensing circuit configured to sense current flowing through the power line that is connected to a respective subset of pixels included in each pixel block included in a row of pixel blocks during the sensing mode, each of the respective subset of pixels included in each pixel block is supplied the sensing data during the sensing mode and each light emitting element included in a pixel from the respective subset of pixels that are arranged in the plurality of columns of pixels within the pixel block is configured to receive the sensing data but not emit light during the sensing mode.

11. The display device of claim 10, wherein the sensing circuit sequentially senses each pixel block included in the row of pixel blocks during the sensing mode such that the respective subset of pixels included in the pixel block are supplied the sensing data and are simultaneously sensed based on the sensed current flowing through the power line according to the sensing data.

12. The display device of claim 11, wherein the sensing data comprises white image data and the display panel driver is configured to supply the white image data to a target pixel block from the row of pixel blocks that is being sensed and supplies black image data to remaining pixel blocks included in the row of pixel blocks that are not being sensed.

13. The display device of claim 10, wherein the sensing circuit includes:

a resistor;

a switch configured to connect the resistor to the power line in series during the sensing mode and configured to disconnect the resistor from the power line during the display mode; and an analog-to-digital converter connected to the resistor in parallel, the analog-to-digital converter configured to convert a voltage difference across the resistor into a digital value during the sensing mode, the voltage difference indicative of the current flowing through the power line during the sensing mode.

14. The display device of claim 13, wherein the resistor includes:

a first resistor connected between the pixel driving voltage and at least one pixel block from the plurality of rows of pixel blocks; and a second resistor connected between a ground voltage and the at least one pixel block, wherein during the sensing mode, the switch is configured to supply to input terminals of the analog-to-digital converter a voltage difference between the pixel driving voltage and the ground voltage, and the switch is configured to supply to the input terminals a voltage difference across the first resistor responsive to the voltage difference between the pixel driving voltage and the ground voltage being within a predetermined voltage range, and the switch is configured to supply to the input terminals of the analog-to-digital converter a voltage difference across the second resistor responsive to either the voltage difference between the pixel driving voltage and the ground voltage exceeding the predetermined voltage range or the voltage difference across the first resistor exceeding the predetermined voltage range.

15. The display device of claim 10, wherein a current flows through light emitting elements included in the plurality of pixels during the display mode, but the current does not flow through the light emitting elements during the sensing mode.

16. A sensing circuit comprising:

a resistor; and a switch configured to serially connect the resistor to a power line that supplies a pixel driving voltage to a plurality of pixels of a display panel during a sensing period, and configured to disconnect the resistor from the power line during a display period during which an image is displayed by the display panel, wherein the plurality of pixels are divided into a plurality of rows of pixel blocks that extend along a first direction and each pixel block including a different subset of pixels from the plurality of pixels where the different subset of pixels in the pixel block are arranged in a plurality of columns of pixels within the pixel block, wherein the sensing circuit is configured to simultaneously sense a subset of pixels from the plurality of pixels that are included in a pixel block from the plurality of rows pixel blocks during the sensing period by measuring a current flowing through the power line responsive to sensing data being applied to the subset of pixels during the sensing period, each of the subset of pixels in the pixel block is supplied the sensing data during the sensing period and each light emitting element included in a pixel from the respective subset of pixels that are arranged in the plurality of columns of pixels within the pixel block is configured to receive the sensing data but not emit light during the sensing period.

17. The sensing circuit of claim 16, further comprising:

an analog-to-digital converter connected to the resistor in parallel, the analog-to-digital converter configured to convert a voltage difference across the resistor into a digital value during the sensing period responsive to the current flowing through the power line.

18. The sensing circuit of claim 17, wherein pixel data of the image is adjusted by a compensation value based on the digital value.

* * * * *